United States Patent
Sivill et al.

(10) Patent No.: US 11,010,997 B2
(45) Date of Patent: *May 18, 2021

(54) METHODS AND APPARATUS TO WIRELESSLY INTERLOCK DOORS

(71) Applicant: Rite-Hite Holding Corporation, Milwaukee, WI (US)

(72) Inventors: Michael Sivill, Dubuque, IA (US);
Ryan P. Beggs, Dubuque, IA (US);
Christopher Saleh, Dubuque, IA (US);
Perry Knutson, Lancaster, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,299

(22) Filed: Jan. 6, 2020

(65) Prior Publication Data
US 2020/0219342 A1 Jul. 9, 2020

Related U.S. Application Data

(63) Continuation of application No. 16/149,701, filed on Oct. 2, 2018, now Pat. No. 10,529,159.
(Continued)

(51) Int. Cl.
*G06K 5/00* (2006.01)
*G07C 9/00* (2020.01)
(Continued)

(52) U.S. Cl.
CPC .......... *G07C 9/00309* (2013.01); *E05F 15/70* (2015.01); *E05F 15/73* (2015.01);
(Continued)

(58) Field of Classification Search
CPC .. G07C 9/00309; H04W 88/06; H04W 12/06; G06Q 10/087; G06Q 10/06; G07F 9/026; E06B 3/485
(Continued)

(56) References Cited

U.S. PATENT DOCUMENTS 5,444,440 A * 8/1995 Heydendahl ............ E05B 47/00
340/5.3
7,775,429 B2 8/2010 Radicella et al.
(Continued)

FOREIGN PATENT DOCUMENTS

EP 2612977 7/2013

OTHER PUBLICATIONS

International Searching Authority, "Invitation to Pay Additional Fees and, Where Applicable, Protest Fee," issued in connection with PCT patent application No. PCT/US2018/066026, dated Mar. 19, 2019, (14 pages).

(Continued)

*Primary Examiner* — Jamara A Franklin
(74) *Attorney, Agent, or Firm* — Hanley, Flight & Zimmerman, LLC

(57) ABSTRACT

Methods and apparatus to wirelessly interlock doors are disclosed. A door system includes a user interface to receive interlock configuration data input from a user, the interlock configuration data to define an interlock condition to be satisfied before a first door is to undergo an operation, the interlock condition associated with a current state of a second door. The door system includes a first wireless transceiver to receive a signal from a second wireless transceiver associated with a second door. The method includes a door operation controller to at least one of (1) implement the operation of the first door in response to a request when the current state of the second door satisfies the
(Continued)

interlock condition, (2) ignore the request, or (3) not execute the operation of the first door in response to the request when the current state of the second door does not satisfy the interlock condition.

20 Claims, 10 Drawing Sheets

Related U.S. Application Data

(60) Provisional application No. 62/607,142, filed on Dec. 18, 2017.

(51) Int. Cl.

| | | |
|---|---|---|
| *G06K 7/10* | (2006.01) | |
| *G06K 7/08* | (2006.01) | |
| *E05F 15/73* | (2015.01) | |
| *E05F 15/70* | (2015.01) | |
| *E05F 17/00* | (2006.01) | |
| *E05F 15/77* | (2015.01) | |
| *E05F 15/76* | (2015.01) | |
| *E05F 15/40* | (2015.01) | |
| *E05F 15/71* | (2015.01) | |
| *E05F 15/79* | (2015.01) | |
| *E05F 15/665* | (2015.01) | |

(52) U.S. Cl.
CPC .............. *E05F 15/76* (2015.01); *E05F 15/77* (2015.01); *E05F 17/00* (2013.01); *G06K 7/087* (2013.01); *G06K 7/10366* (2013.01); *E05F 15/40* (2015.01); *E05F 15/665* (2015.01); *E05F 15/71* (2015.01); *E05F 15/79* (2015.01); *E05F 2017/005* (2013.01); *E05Y 2400/42* (2013.01); *E05Y 2400/80* (2013.01); *E05Y 2400/81* (2013.01); *E05Y 2400/85* (2013.01); *E05Y 2800/21* (2013.01); *E05Y 2900/106* (2013.01); *E05Y 2900/108* (2013.01); *E05Y 2900/11* (2013.01)

(58) Field of Classification Search
USPC ........................................ 235/375, 382, 385
See application file for complete search history.

(56) References Cited

U.S. PATENT DOCUMENTS

| | | |
|---|---|---|
| 8,269,602 B2 | 9/2012 | Graichen |
| 8,378,988 B1 | 2/2013 | Artino et al. |
| 9,506,284 B2 | 11/2016 | Braverman et al. |
| 10,529,159 B2 | 1/2020 | Sivill et al. |
| 2009/0324235 A1 | 12/2009 | Butler |
| 2014/0331557 A1 | 11/2014 | Bruns et al. |

OTHER PUBLICATIONS

International Searching Authority, "International Search Report and Written Opinion," issued in connection with PCT patent application No. PCT/US2018/066026, dated Jul. 5, 2019, (36 pages).

United States Patent and Trademark Office, "Notice of Allowance and Fee(s) due" issued in connection with U.S. Appl. No. 16/149,701, filed Jun. 26, 2019, (21 pages).

United States Patent and Trademark Office, "Corrected Notice of Allowability" issued in connection with U.S. Appl. No. 16/149,701, filed Dec. 11, 2019, (13 pages).

Australian Government, "Examination Report No. 1 for Standard Patent Application," issued in connection with Australian patent application No. 2018392923, dated Feb. 4, 2021, 5 pages.

* cited by examiner

METHODS AND APPARATUS TO WIRELESSLY INTERLOCK DOORS

RELATED APPLICATION

This patent arises from a continuation of U.S. patent application Ser. No. 16/149,701 (now U.S. Pat. No. 10,529, 159), which was filed on Oct. 2, 2018, and which claims priority to U.S. Provisional Patent Application Ser. No. 62/607,142, which was filed on Dec. 18, 2017. U.S. patent application Ser. No. 16/149,701 and U.S. Provisional Patent Application Ser. No. 62/607,142 are hereby incorporated herein by reference in their entireties.

FIELD OF THE DISCLOSURE

This disclosure relates generally to controlling powered doors, and, more particularly, to methods and apparatus to wirelessly interlock doors.

BACKGROUND

Industrial and commercial buildings often have a number of powered doors that open, close, and/or perform some other operation in response to some sort of input signal requesting the particular door operation. Examples of powered doors include horizontal roll-up doors, vertical roll-up doors, horizontally translating doors, vertically translating doors, swinging doors, and concertina doors. Input signals for triggering door actuation can be from various sources, such as a manually operated actuator, or a proximity/motion sensor that detects a person or vehicle near or moving relative to the door. A system of multiple doors usually has control means for ensuring that the correct door and the correct door operation is actuated in response to a particular input signal.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
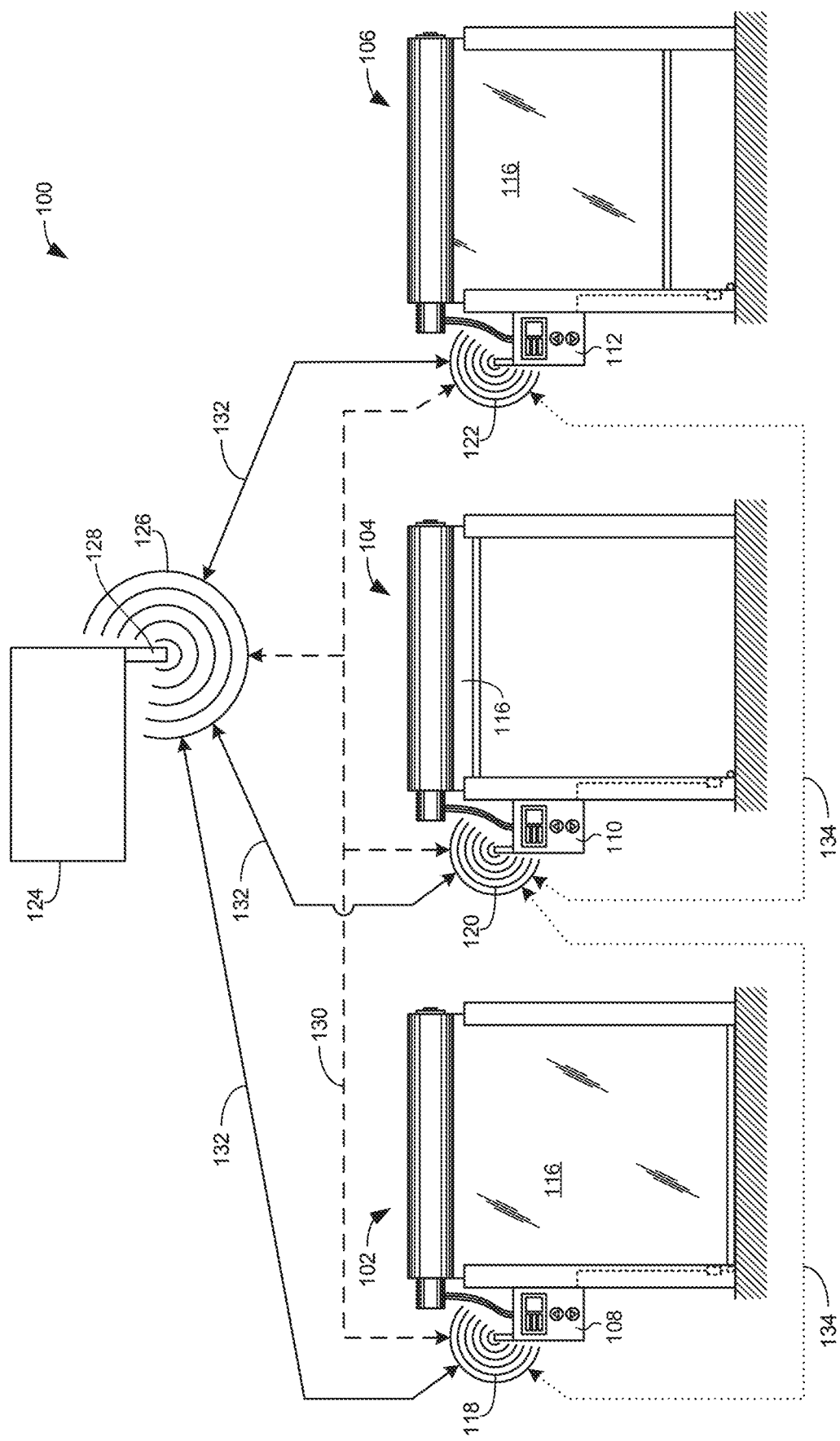
FIG. 1 illustrates an example door system constructed in accordance with teachings disclosed herein.

In buildings and/or other facilities that have multiple doors, it is often desirable to establish interlock relationships between different ones of the doors to control their operation. As used herein, two doors are in an interlock relationship when the operation or state of a first one of the doors is dependent or conditioned on the second one of the doors being in a particular state. In some examples, the operation of one of the doors in an interlock relationship is inhibited or prevented in response to the other door being in the relevant state defined by the interlock relationship. As an example, two doors may be interlocked such that either door is prevented from opening unless the other door is closed. In other examples, the operation of one of the doors may be triggered in response to the other door being in the relevant state defined by the interlock relationship. For example, when the second door opens, the interlock relationship may cause the first door to automatically open (if it isn't already open). In some examples, an interlock relationship may be one directional such that the operation of a first door is conditioned on the state of a second door, but the second door may operate regardless of the state of the first door. For example, a first door may generate an alert or notification whenever the second door is opened while the second door may open or close without regard to the state of the first door.

The particular operation of the first door that is dependent or conditioned on the state of the second door may correspond to any operation of the first door including, for example, closing the door, opening the door, locking the door, unlocking the door, generating a notification or alert for personnel on either side of the door, etc. Similarly, the state of the second door that must satisfy a particular interlock condition for the first door to operate may correspond to any state of the door including, for example, closed, open, partially open, closing, opening, about to close, about to open, locked, unlocked, in an override state, in a fault state, etc.

Interlock door systems may be implemented for any number of reasons including security, safety, traffic flow, controlling of space occupancy (e.g., living beings, equipment, and/or items, etc.), controlling and/or maintenance of environmental conditions (e.g., air pressure, temperature, humidity, and/or light, etc.) and/or differentials thereof between spaces, reducing (e.g., preventing) and/or otherwise controlling movement of contaminants (e.g., light, chemicals, fumes, pathogens, particulates, and/or bugs, etc.), and so forth. The particular reasons for interlocking doors may depend on the particular application and/or environment in which the doors are implemented. In some examples, doors provide entry/exit ways to and from an enclosed area (e.g., a vestibule). In some cases, the enclosed area is intended to enable movement of certain factors (individuals, materials/goods, equipment, etc.) while reducing (e.g., preventing, minimizing) movement of other factors (contaminants, heat/cold, humidity, etc.) between spaces by restricting air flow and/or maintaining an air pressure differential therebetween. In some cases, the enclosed area may be a space where procedures for decontamination (e.g., cleaning) and/or containment (e.g., gowning) are performed on individuals, materials/goods, or equipment moving between the spaces.

In the past, interlocked door systems have been implemented using hardwired connections between the separate doors. Running wires between multiple doors to configure such systems can be time consuming and complex, especially as the number of doors in the system increases. Furthermore, hardwired interlock systems are fixed at the time of installation such that they cannot be reconfigured (e.g., to add a door, remove a door, or change interlock functionality) without significant time and expense. Further, when a hardwired interlock system is changed, there is a need for arc flash protection. Another limitation of hardwired interlock systems arises from the use of relays that may have a response delay resulting in the failure of an interlock relationship being properly maintained under certain circumstances. For example, two doors may be hardwire interlocked such that either door is prevented from opening if the other is open. Due to the nature of hardwired interlock systems, if both doors receive an input signal requesting the doors to open at approximately the same time, there is no way for either door to be aware of the request to the other door. As a result, both doors may open contrary to the interlock relationship.

Examples disclosed herein overcome the limitations of hardwired interlock systems by enabling a control scheme that can be readily configured and reconfigured without changing any hardwiring of the door system. More particularly, in some examples, each door of the interlocked group of doors has a corresponding controller system that wirelessly communicates with the other doors in the group so that each door controller system can determine the state of the other doors based on wireless signals transmitted therebetween. In some examples, a door that receives a request to perform a particular operation may request other interlocked doors to report their current state before the first door implements the requested operation. In this manner, there is a greatly reduced chance for the interlock condition to inadvertently fail to be realized.

Examples disclosed herein provide additional advantages over hardwired systems including that an interlock system can be easily reconfigured to add or remove doors by simply adding or removing the door from the wireless network associated with the interlocked doors. Furthermore, because communication between the doors (e.g., communications between the door controllers of the doors) is accomplished wirelessly, it is possible for the doors to also communicate with mobile devices such as, for example, automated guided vehicles (AGV), fork trucks, and portable handheld devices (e.g., smartphones, tablets, etc.) that are within communication range of the doors. Further, examples disclosed herein enable the communication of real-time information (e.g., symbols, words, facility map) of the status of the interlocked doors and/or any other relevant information (i.e. door Z opening, closing, closing in x seconds, held open, door Y in fault etc.). Such information may be presented on a display associated with any one of the doors or a mobile device. In some examples, the wireless capabilities for doors disclosed herein may be retro-fitted to existing doors or other equipment to be integrated into a wireless network passively or actively. With the flexibility of example wireless interlock systems disclosed herein, it is also possible to enable specific conditions, personnel, equipment and/or combinations thereof to override a particular interlock condition as appropriate.

FIG. 1 illustrates an example door system 100 constructed in accordance with teachings disclosed herein. For purposes of discussion, the example door system 100 of FIG. 1 includes three vertical roll-up doors 102, 104, 106. However, teachings disclosed herein may be implemented in a system with any suitable number of doors, whether more or less than three. Further, teachings disclosed herein may be implemented in connection with other types of doors including, for example, horizontal roll-up doors, vertically translating doors, horizontally translating doors, swinging doors, concertina doors, etc. In some examples, the door system 100 includes more than one type of door. Further, while the doors 102, 104, 106 shown in FIG. 1 are power operated doors, in other examples, one or more of the doors may be manually operated. Furthermore, the doors 102, 104, 106 in the example system 100 may be in any suitable arrangement relative to one another.

Figure 2:
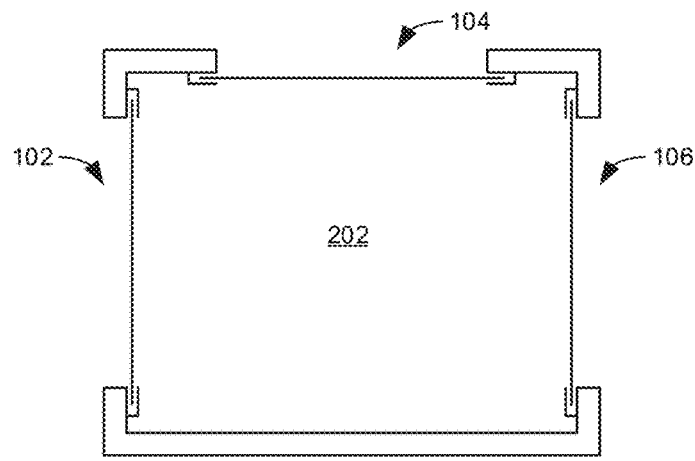
FIG. 2-4 illustrate example arrangements of the example doors shown in FIG. 1
Figure 3:
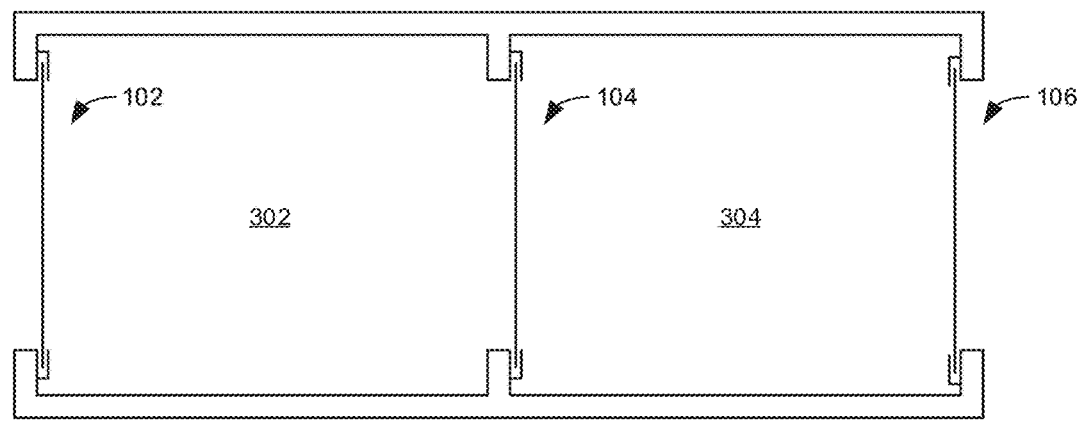
Figure 4:
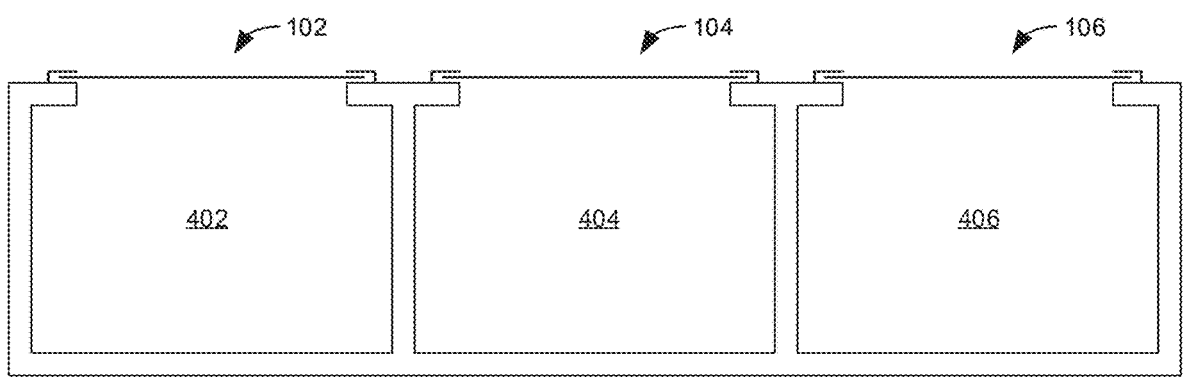

For example, as shown in the example of FIG. 2, all three of the doors 102, 104, 106 may selectively block or unblock separate passageways into a common area 202. In the illustrated example of FIG. 3, the first and third doors 102, 106 selectively block or unblock passageways into separate areas 302, 304 with the second door 104 selectively blocking or unblocking a passageway between the two areas 302, 304. In the illustrated example of FIG. 4, the three doors 102, 104, 106 selectively block or unblock passageways into three different areas 402, 404, 406. Other arrangements are also possible.

In the illustrated example of FIG. 1, the first door 102 is in a closed state, the second door 104 is in a fully open state (also referred to herein simply as an open state), and the third door 106 is in a partially open state. In the illustrated example of FIG. 1, each of the doors 102, 104, 106 is associated with a corresponding door controller system 108, 110, 112. The door controller systems 108, 110, 112 control operation of the respective doors 102, 104, 106 by causing a door panel 116 (e.g., a roll-up curtain) to move up or down between a closed position (corresponding to the closed state of the door) and an open position (corresponding to the open state of the door). In some examples, a single door controller system 108, 110, 112 controls the operation of more than one of the doors 102, 104, 160. In some examples, the doors 102, 104, 106 may include operations other than opening or closing the door that are controlled by the controller systems 108, 110, 112. For example, the door controller systems 108, 110, 112 may generate alarms and/or notifications associated with the doors, lock or unlock the doors, implement a clock or timer to countdown a time before another door operation is to take place, and so forth.

Further detail regarding the structure and operation of the doors 102, 104, 106 is shown and described in connection with FIG. 5, which illustrates an example door 500 constructed in accordance with teachings disclosed herein. The example door 500 of FIG. 5 may correspond to any one of the doors 102, 104, 106 of FIG. 1. As shown in the illustrated example of FIG. 5, the door 500 includes a drive motor 502 that can rotate in either direction, as controlled by the door controller system 108, 110, 112, to roll-up or unroll the door panel 116 about a drum or mandrel 504. The example door 500 of FIG. 5 includes a set of lateral tracks 506 to guide the door panel 116 as the panel moves vertically between the open and closed positions. In some examples, an electromechanical limit switch 508 provides a signal to a door controller system 510 indicative of whether the door 500 is in a closed state or a non-closed state (e.g., fully open or partially open). Additionally or alternatively, in some examples, whether the door is in a closed or a non-closed state may be detected using a different type of sensor (e.g., an optical sensor)

In the illustrated example, the door controller system 510 corresponds to any of the door controller systems 108, 110, 112 of FIG. 1. Although the controller system 510 is represented in the illustrated example as a single unit within a single housing, in some examples, the controller system 510 may correspond to multiple interconnected devices in one or more housings. For instance, in some examples, the controller system 510 includes a main control box that provides the functionality to control operation of the door 500 with a separate display to provide notifications to a user and a separate user interface that enables the user to interact with the controller system 510. Further, in some example the controller system 510 includes an isolated power disconnect to enable a user (e.g., a door installer or system commissioner, etc.) to manually shut down the controller system 510. In some examples, the separate power disconnect provides sufficient electrical isolation between a power source and the main control box and/or other components of the door 500 such that the main control box and other components can be worked on without requiring arc flash protection or power shut off at a location that is more remote and/or services multiple pieces of equipment.

In some examples, the door 500 may include sensors (e.g., sensors monitoring the motor 502, the drum 504, the area on either side of the panel 116, the area under the panel 116 when partially or fully opened, etc.) to provide feedback signals to the door controller system 510 indicative of states and/or circumstances associated with the door 500 other than the door being closed. For instance, in some examples, rather than indicating the state of the door 500 with reference to a fully closed position (e.g., a closed state versus a non-closed state), a limit switch or other sensor may indicate the state of the door 500 relative to a fully open position (e.g., an open state versus a non-opened state). In some examples, one or more sensors may provide signals indicative of the current position of the door panel 116 at any particular point along its travel path between the open and closed positions. In some examples, one or more sensors may provide signals indicative of a current or impending change in the state of the door 500 (e.g., opening, about to open, closing, about to close, in fault mode, etc.). In some examples, one or more sensors may provide signals indicative of whether the door is locked or unlocked. In some examples, one or more sensors may provide signals indicative of people, equipment, and/or other items approaching the door 500. In some examples, one or more sensors may provide signals indicative of whether people, equipment, and/or other items have passed through the door 500 when in the open position.

In addition to or instead of the example door controller system 510 controlling the door 500 based on sensor feedback signals received from sensors (motion sensors, proximity sensors, photoelectric eyes, limit switches, encoders, infrared detectors, an ultrasonic emitter/receiver, a radio signal transmitter, a camera, etc.), the door controller system 510 may control the door 500 based on user inputs received via a user input interface associated with the controller system. In some examples, the user input corresponds to a request by the user for the door 500 to engage in a particular operation (e.g., open the door, close the door, lock the door, unlock the door, stop movement of the door, etc.). In some examples, such user requests are initiated by a user physically flipping a switch and/or pressing a button (e.g., buttons 512) associated with the user input interface and/or performing some other manually implemented act. Additionally or alternatively, the user may initiate a request for a door operation by selecting a soft switch 514 on a touchscreen display 516 associated with the door controller system 510. In some examples, the user may initiate a request for a door operation (e.g., open the door) by coming within proximity of a particular sensor associated with the door (e.g., radio controls, RFID readers, magnetic card readers, motion sensors, induction loops, etc.).

Some of the above means for a user to trigger a request for a door operation are capable of uniquely identifying the user (e.g., RFID readers, magnetic card readers, etc.), whereas other means may trigger the request without enabling the system to determine the person's identity. Door activation methods that are able to identify or authenticate the identity of an individual requesting activation or operation of a door are referred to herein as discriminative methods. Door activation methods that do not determine the identity of an individual initiating a door operation request are referred to herein as non-discriminative. In addition to being either discriminative or non-discriminative, user initiated door activation methods may be categorized as either passive or active. A passive door activation method is one in which the operation of a door is automatically implemented (e.g., automatically opened) as a person approaches the door (i.e., without the user having to take any action beyond approaching the door). Passive door activation methods include long-range RFID communications, motion detectors, induction loops, etc. An active door activation method is one in which the operation of the door is triggered based on a specific action by a user such as, for example, initiating a radio control transmission, swiping a magnetic card, touching a short-range RFID tag to a sensor, pushing a button, pulling a cord, etc.

Passive, discriminative door activation methods provide convenience to users (because they do not have to take any affirmative action to activate the door) and provide security (because they only activate if the identity of the user can be determined and/or authenticated). However, most existing passive, discriminative methods involve the user carrying a special-issued device (e.g., a long-range RFID tag). As a result, while users may not need to perform any particular action when approaching a door, they must nevertheless be inconvenienced by having to carry the specially distributed device. Furthermore, to maintain the benefits of increased security, the distribution and tracking of who has such distributed devices must be carefully monitored and controlled. In some examples disclosed herein, passive, discriminative door activation is accomplished by a user implementing an authentication application on a mobile device (e.g., a smartphone) that wirelessly communicates (e.g., via Bluetooth or Wi-Fi technology) with a mobile device sensor associated with the door. Inasmuch as many people already carry a smartphone, this approach does not require the user to carry any device they are not already carrying. Furthermore, the secure distribution of a mobile authentication application is much easier to accomplish than issuing physical devices because a user may download the application after providing the appropriate credentials (e.g., a security code provided via text message or email) without any sort of physical transfer. A similar approach to this has been implemented in hotels in which patrons check-in with their smartphones to be issued a virtual key that automatically unlocks the user's hotel room as they approach the door. However, examples disclosed herein take this process further by automatically opening a door as a user approaches. Further, in some examples, when users are authenticated but they are not authorized to activate the door based on their credentials, the door system may generate an alert and/or notification for the user to explain that they are not authorized.

In some examples, the door controller system 510 may additionally or alternatively control operation of the door 500 based on wireless signals received via a wireless transceiver 518 associated with the door controller system 510. In some examples, the wireless signals received by the transceiver 518 associated with the door controller system 510 of the door 500 are signals generated by a different door controller system of a different door and transmitted or broadcast with a transceiver associated with the different door controller system. Thus, returning to FIG. 1, each of the door controller systems 108, 110, 112 associated with a different door 102, 104, 106 may generate and transmit respective wireless signals 118, 120, 122 that may be received at other ones of the doors. Additionally or alternatively, in some examples, the door system 100 includes a main controller system 124 that may transmit wireless signals 126 with a corresponding wireless transceiver 126 to one or more of the doors 102, 104, 106 and receive the wireless signals 118, 120, 122 transmitted from the other doors 102, 104, 106. In some examples, the main controller system 124 corresponds to a door controller system associated with another door. That is, in some examples, one of the door controller systems 108, 110, 112 may implement the main controller system 124. In other examples, the main controller system 124 may be omitted.

In some examples, the door controller systems 108, 110, 112 and the main controller system 124 are part of a wireless mesh network so that any one of the controller systems 108, 110, 112, 124 may wirelessly communicate with any other one of the controller systems 108, 110, 112, 124. Such wireless communications are represented by the dash-lined arrows 130 shown in the illustrated example of FIG. 1. In some examples, the door controller systems 108, 110, 112 communicate with one another indirectly via the main controller system 124. That is, in some examples, different ones of the door controller systems 108, 110, 112 are limited to direct wireless communications with the main controller system 124 as represented by the solid-lined arrows 132 in the illustrated example. In some such examples, the main controller system 124 may relay signals received from one door 102, 104, 106 to a different one of the doors 102, 104, 106. In some examples, different ones of the door controller systems 108, 110, 112 may be able to directly communicate with some of the other doors but not all of them. In some instances, the inability for two door controller systems 108, 110, 112 to directly communicate via wireless transmissions is based on the associated doors being located at a distance greater than the communication range of the wireless signal transmissions. In some such examples, one or more doors may be positioned between the first two doors to bridge the gap between the communication range of the first two doors to relay signals therebetween (as represented by the dotted-line arrows 134 in the illustrated example of FIG. 1).

As mentioned above, the door controller system 108, 110, 112 for the doors 102, 104, 106 may control the corresponding door based on the wireless signals 118, 120, 122, 126 received from the other controller systems 108, 110, 112, 124. More particularly, in some examples, the operation of a particular door may be dependent or conditioned on one or more other doors being in a particular state as reported in the wireless signals 118, 120, 122. Thus, in some examples, the wireless signals 118, 120, 122, 126 include status information indicative of the current state of the doors 102, 104, 106 generating the corresponding wireless signals. In some examples, the wireless signals 118, 120, 122, 126 also include identifier information to indicate the door generating a particular signal (e.g., a source identifier) and/or to indicate the intended door(s) to which the signal is directed (e.g., a recipient identifier). By wirelessly broadcasting the current state of the doors 102, 104, 106, the door controller system 108, 110, 112 for any given door is able to determine the current state of any other door to then use that information in controlling when particular door operations for the given door may be implemented and when the door operations should be inhibited.

As an example, the first door 102 may be configured in an interlocking relationship with the second door 104 so that the implementation of one or more particular operations of the first door 102 are inhibited or prevented unless a particular condition associated with the current state of the second door 104 is satisfied. The particular operation(s) of the first door 102 that may be conditioned on the state of the second door 104 include any operation of the first door 102 such as, for example, opening the door, closing the door, locking the door, unlocking the door, generating a notification in an area adjacent at least one side of the door, etc. The particular state(s) of the second door 104 that may satisfy the condition for the operation(s) of the first door 104 may include any state of the door such as, for example, closed, closing, about to close, open, opening, about to open, partially open, locked, unlocked, in an override state, in a fault state, etc.

Continuing with the above example, for the first door controller system 108 (associated with the first door 102) to determine whether the current state of the second door 104 satisfies the condition designated for the particular door operation(s), the first door controller system 108 needs to determine the current state of the second door 104. In the illustrated example, this is accomplished through the wireless signals 118, 120 transmitted between the two doors 102, 104. In some examples, the wireless signal 118 from the first door 102 may include an operation request signal that indicates the first door 102 has received a request to perform an operation that is interlocked or conditioned on the state of one or more of the other doors 104, 106. In some examples, the request to perform the operation may be based on user input via a user input interface of the door controller system 108 (e.g., the user pressing one of the buttons 512 of FIG. 5 and/or interacting with the touchscreen 516 of FIG. 5). Additionally or alternatively, the request to perform the operation may be based on feedback from a sensor associated with the door 102 (e.g., a proximity sensor may detect a person is approaching the door 104, thereby triggering a request to open the door). When the second door controller system 110 receives the operation request signal (e.g., the wireless signal 118) from the first door 102, the second door 104 controller system 110 may, in response, generate and transmit a status response signal (e.g., the wireless signal 120) that includes an indication of the current status of the second door. Once the status response signal from the second door 104 is received by the first door controller system 108, the first door controller system 108 may determine whether the current state of the second door 104 (as reported in the status response signal) satisfies the interlock condition before implementing the requested operation.

In some examples, the third door controller system 112 may receive one or both of the operation request signal (from the first door 102) and the status response signal (from the second door 104). However, in some examples, the third door controller system 112 may ignore the transmissions based on a recipient identifier in the operation request signal and/or the status response signal that indicates the signals were not intended for the third door 106. In other examples, the third door controller system 112 may analyze the signals relative to stored interlock configuration data to determine whether the signals are relevant to the third door. In other examples, the third door controller system 112 may automatically respond to the operation request signal from the first door 102 by transmitting a status response signal (e.g., the wireless signal 122) in a similar manner to the second door 104. In such examples, the first door controller system 108 receives both status response signals (one from each of the second and third doors 104, 106) and determines what information is relevant in determining whether the interlock condition for the door operation is satisfied.

In the foregoing example, the first door controller system 108 determines the current state of the second door 104 by broadcasting a request for the other doors 104, 106 to report their current statuses. Additionally or alternatively, in some examples, the first door controller system 108 may determine the current state of the second door 104 (as well as the third door 106) based on the wireless signals 120, 122 transmitted from the second and third doors 104, 106 independent of a request sent out from the first door 102. More particularly, in some examples, the door controller systems 108, 110, 112 of the doors 102, 104, 106 may automatically transmit a status change signal to the other doors to indicate when a change in state of the corresponding door has occurred. In some examples, the door controller systems 108, 110, 112 store a most recent state reported from each of the other doors 102, 104, 106 and updates the most recent state upon receipt of a new status change signal. In this manner, the door controller systems 108, 110, 112 may determine the current state of any particular door at any particular point in time without having to specifically request the state of the doors.

As described above, in some examples, if one of the door controller systems 108, 110, 112 of one of the doors 102, 104, 106 determines that an interlock condition associated with a particular door operation is satisfied based on the current state of the relevant other door(s) 102, 104, 106, the door controller system 108, 110, 112 proceeds to implement the particular door operation. If the door controller system 108, 110, 112 determines that the current state of the relevant other door(s) 102, 104, 106 does not satisfy the interlock condition, the door controller system 108, 110, 112 ignores the request for the particular door operation and/or otherwise inhibits or prevents the particular operation of the door from occurring. In some examples, the door controller system 108, 110, 112 may automatically dismiss the request in response to a relevant interlock condition not being satisfied. In some examples, the door controller system 108, 110, 112 may monitor the status of the other relevant door(s) 102, 104, 106 for a threshold period of time before dismissing the request. In such examples, if the status of the relevant door(s) 102, 104, 106 changes such that the new state for the door satisfies the interlock condition within the threshold period of time, the door controller system 108, 110, 112 proceeds to implement the requested operation.

In some examples, in response to determining an interlock condition is not satisfied, the door controller system 108, 110, 112 delays implementation of the requested door operation for a period of time. In some examples, the delayed period of time is based on information contained in the wireless signals received from the relevant door(s) 102, 104, 106. For example, assume that the requested operation is to open the first door 102 and that this particular door operation is conditioned on the third door 106 being in a closed state. In some examples, the third door 106 is configured to open for a fixed period of time (e.g., 15 seconds, 30 seconds, 1 minute, etc.) before automatically being closed again. In some such examples, when the third door 106 transmits the wireless signal 122 reporting that the door 106 is currently in an open state, the wireless signal 122 may also include an indication of when the door is expected to close again (e.g., the fixed period of time after it was first opened). Thus, if the first door controller system 108 receives a request to open the first door 102 while the third door 106 is open, the first door controller system 108 may determine when the third door 106 is expected to close and, therefore, delay opening the first door until the remaining time for the third door 106 to be open as elapsed. In some examples, the first door controller system 108 may verify the current state of the third door 106 after the delay period of time before proceeding to open the first door 102 because there may have been circumstances that caused the third door 106 to remain open longer than originally reported.

In some examples, while the door controller systems 108, 110, 112 may inhibit a particular door operation when a corresponding interlock condition has not been satisfied, the door controller systems 108, 110, 112 may nevertheless initiate one or more different door operations in response to the condition not being satisfied. For example, if the requested door operation came from a user pressing one of the buttons 512 and/or interacting with the touchscreen display 516, the door controller systems 108, 110, 112 may generate an alert and/or notification, via the display 516, that informs the user that the requested operation cannot currently be performed. In some examples, the alert and/or notification provides information about the reasons the requested door operation is currently prohibited. For example, the alert and/or notification may indicate that the current state of a different door does not satisfy a relevant interlock condition. In some examples, the alert and/or notification may specifically identify the other door, the current state of the other door, and/or the interlock condition. In some examples, the alert and/or notification may provide an estimated time period before the interlock condition is expected to be satisfied and the requested operation may be performed. In some examples, the alert and/or notification may provide a user with an option to override the interlock condition and proceed with the requested operation despite the condition not being satisfied. In some examples, the door controller systems 108, 110, 112 may generate an alert and/or notification even when no user is located and/or detected at the corresponding door. In some examples, the alert and/or notification may be provided independent of the display 516 using other visual and/or audible means (e.g., a light, a bell, a horn, etc.).

The example notifications described above are provided in response to an interlock condition associated with a requested door operation not being satisfied. In some examples, notifications may be provided independent of a requested door operation and/or regardless of a particular interlock condition being satisfied. For example, the display 516 may provide a list of identifiers or a schematic of the doors in the interlock system and their corresponding relationships. In some examples, a user may use the list or schematic to select and/or identify any one of the displayed doors to access information about that door (e.g., current status, interlocking relationships, etc.) and/or to configure/reconfigure the interlock relationships of the associated door with the selected door and/or between the selected door and any other door. In some examples, the display 516 may provide a status update (e.g., door opening, door closing, door closing in a given amount of time (e.g., door closing in 1 second, 5 seconds, etc.) of all the interlocked doors 102, 104, 106 in an interlock system.

In some examples, notifications (whether provided in response to a requested door operation subject to an interlock condition) may be wirelessly transmitted (e.g., via a Wi-Fi or Bluetooth connection) to a mobile device carried by a user at the door. Thus, in some examples, a user may interact with ones of the doors and/or obtain feedback regarding the status of the doors independent of displays that may be located at the respective doors.

To enable the interlocking relationships between the different doors 102, 104, 106 based on the wireless signals 118, 120, 122 as described above, the door controller systems 108, 110, 112 need to be configured with the relevant interlock conditions defined with respect to the relevant doors. In some examples, each door controller system 108, 110, 112 is separately configured via a user interface (e.g., associated with the display 516 of FIG. 5). That is, in some examples, the interlock conditions defining when certain operations of the first door 102 are to be prevented are input by a user interacting with the first door controller system 108. Similarly, in some examples, the interlock conditions defining when certain operations of the second or third doors 104, 106 are to be prevented are input by a user interacting with the respective second or third door controller systems 110, 112. As a specific example, assume the first and second doors 102, 104 are to be interlocked such that neither door can open when the other is already opened (i.e., in a non-closed state including being fully open or partially open). In some such examples, first interlock configuration data may be entered into the first door controller system 108 to designate that the operation of opening the first door 102 is conditioned on the second door 104 being in the closed state. This defines half of the interlocking relationship between the two doors in this example. To give effect to the other half of the relationship, second interlock configuration data may be entered into the second door controller system 110 to designate that the operation of opening the second door 104 is conditioned on the first door 102 being in the closed state.

Additionally or alternatively, in some examples, the interlock conditions for multiple ones (or all) of the doors 102, 104, 106 may be configured from the main controller system 124. In some examples, configuration of more than one of the separate doors 102, 104, 106 is accomplished through a particular one of the door controller system 108, 110, 112. That is, in some examples, the interlock conditions for particular operations of the first door 102 as well as the interlock conditions for particular operations of the second door 104 may both be configured via either the first door controller system 108 or the second door controller system 110.

Regardless of whether interlock relationships between different ones of the doors 102, 104, 106 are configured individually at each door, all together at a single door, or in some other combination, for a particular door controller system 108, 110, 112 to implement particular interlock configurations, the door controller system also needs to be able to associate the specific wireless signals 118, 120, 122 received from other doors to the particular door from which the signals were transmitted. That is, when a given controller system 108, 110, 112 receives wireless signals from more than one other door, the controller system needs to be able to distinguish signals from the different doors to process the content of the signals appropriately in light of any relevant interlock conditions. Accordingly, in some examples, the wireless signals 118, 120, 122 transmitted from any of the doors 102, 104, 106 include a source identifier that identifies the particular door from which the signal originated. In some examples, where one transceiver repeats or relays a signal received from another transceiver, the relayed message includes the source identifier from the original signal.

In some examples, when one of the door controller systems 108, 110, 112 is being initialized in a system of interlocked doors and/or a new or different door is being introduced to the interlock system, the door controller system implements a door discovery procedure to identify all doors within communication range (either directly or based on repeating signals through a wireless mesh network). In some examples, the door discovery procedure is implemented automatically by broadcasting a wireless discovery request signal for all other doors to identify themselves. Any door within communication range of the discovery request signal may, in response, transmit a discovery response signal that identifies the corresponding door. In some examples, a discovery response signal may be the same as a status response signal in that the signal may also include an indication of the current state of the associated door. In some examples, as the new controller system implementing the door discovery procedure receives the discovery response signals from other doors, the new controller system stores the source identifier for each separate door in a database for future reference. In some examples, the door controller systems for the other doors may also store the identifier for the new door in the system in corresponding databases. In some examples, the door discovery procedure to detect and identify wirelessly networked doors may be implemented independent of any specific request polling doors to identify themselves. More particularly, in some examples, the door controller systems automatically broadcast wireless status signals substantially continuously or at relatively frequent intervals (e.g., every second, every five seconds, etc.). In such examples, when a particular door controller system receives a wireless signal from a new door (based on a new source identifier), the door controller system adds the new door to a database of all doors recognized within the wireless network.

In some examples, the different doors detected through the door discovery procedure as outlined above may be provided to a user configuring the interlocking relationships for a particular door. That is, in some examples, when a user indicates the desire to configure or reconfigure the interlocking relationships for a door, a list of the doors that have been discovered by the corresponding door controller system may be populated on a screen for user selection. This can greatly simplify the configuration process for a user because the user does not need to manually determine or identify the doors that may be the subject of an interlocking relationship.

In some examples, multiple different interlock systems may be established between different groups of doors that are all within communication range of one another. Such situations may arise when the different interlock systems are intended to serve different purposes (e.g., security, safety, traffic flow, controlling of space occupancy (e.g., living beings, equipment, and/or items, etc.), controlling and/or maintaining environmental conditions (e.g., air pressure, temperature, humidity, and/or light, etc.) and/or differentials thereof between spaces, reducing (e.g., preventing) and/or otherwise controlling movement of contaminants (e.g., light, chemicals, fumes, pathogens, particulates, and/or bugs, etc.), etc.). In some examples, one or more doors may be common to the separate interlock systems. In some examples, the interlock systems may be completely independent of one another. In some such examples, to avoid the doors associated with one interlock system from receiving and processing wireless signals intended for a different interlock system, the separate interlock systems may be configured to transmit wireless signals at different frequencies to enable communications associated with the different systems to be distinguished.

In some examples, other aspects of the operation of a particular door 102, 104, 106 may be configured by a user via the corresponding door controller system 108, 110, 112. For instance, in some examples, a user may provide scheduling configuration data that defines an activation schedule for one or more components of a door and/or for one or more operations of the door. In some examples, the activation schedule defines certain time periods (e.g., particular days, particular hours of the day, etc.) when one or more particular door components and/or operations based on such components are to be activated and when they are to be deactivated. In other words, rather than door operations being conditioned on the current state of another door, in some examples, door operations (and/or the operation of particular door components) may be conditioned on the current time. In some examples, particular groups of components may be collectively configured to operate on a common schedule. In some examples, the groups of components may be identified based on the location of the components relative to the door (e.g., on an exterior side or on an interior side) and/or the type of component (e.g., all motion sensors). The components of a door that may be assigned a particular activation schedule include any component associated with the door such as, for example, card readers, motion sensors, lights, proximity sensors, display screens, motors, etc. In some examples, some components may be configured to be active at all times such as, for example, reversing photo-eyes and/or door stopping devices.

As a specific example, assume that two zones or areas for the first door 104 of FIG. 1 are designated to include an exterior side of the door and an interior side of the door. Further assume that the door 104 includes a card reader and a first motion sensor on the exterior side of the door (e.g., the exterior zone) and a second motion sensor the interior side of the door (e.g., the interior zone). A user may provide scheduling configuration data that specifies that the exterior zone (e.g., including the card reader and the first motion sensor) is to be activated from Monday to Friday between 6:00 a.m. and 2:00 p.m. and that the interior zone (e.g., including the second motion sensor) is to be activated from Monday to Saturday between 4:00 a.m. and 11:00 p.m. In such a scenario, the operation or activation of the components on the exterior side of the door is different that the operation or activation of the components on the interior side of the door.

In some examples, interlock conditions designated for a door may be combined with schedule-based conditions. That is, in some examples, a particular interlocking relationship between two or more doors may be configured to apply when the current time corresponds to a particular activation schedule designated for the interlocking relationship.

Figure 6:
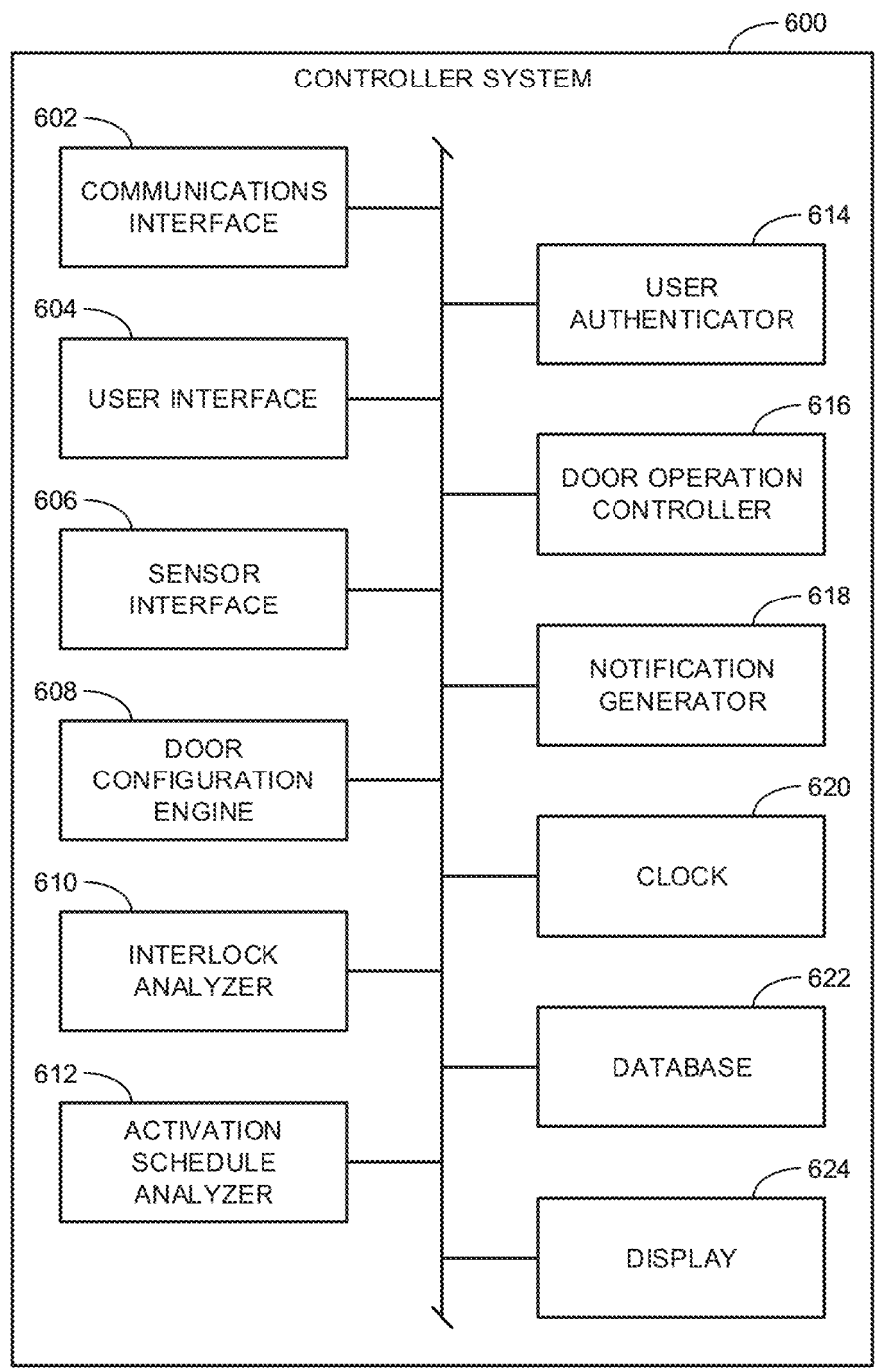
FIG. 6 is a block diagram illustrating an example implementation of any one of the controller systems of FIGS. 1 and/or 5.

FIG. 6 is a block diagram illustrating an example controller system 600 to implement any of the example controller systems 108, 110, 112, 124, 510 of FIGS. 1 and/or 5. The example controller system 600 includes an example communications interface 602, an example user interface 604, an example sensor interface 606, an example door configuration engine 608, an example interlock analyzer 610, an example activation schedule analyzer 612, an example user authenticator 614, an example door operation controller 616, an example notification generator 618, an example clock 620, an example database 622, and an example display 624.

The example communications interface 602 includes and/or interfaces with the transceiver 518 to wirelessly transmit signals (e.g., the wireless signals 118, 120, 122) to other controller systems and to receive wireless signals from the other controller systems. Additionally or alternatively, the example communications interface 602 may enable the transmission and receipt of hardwired signals to and from other controller systems. In some examples, information contained in wireless signals received from other doors (e.g., door identifiers, status information, door operation request information, configuration data, etc.) are stored in the example database 622.

The example user interface 604 includes and/or interfaces with a keyboard, buttons, switches, and/or other mechanisms by which a user may initiate a request for the door to perform a particular operation, input configuration data, override an interlock condition for the door, and/or otherwise interact with the controller system 600. Further, in some examples, the user interface includes and/or interfaces with the display 624 to provide notifications, alerts, prompts for input, and/or other information to a user interacting with the door. In some examples, the display 624 is a touchscreen display (e.g., the touchscreen display 516 of FIG. 5) that can also receive inputs from the user. In some examples, the user interface 604 provides notifications, alerts, and/or other information to a user independent of the display 624 with other visual indicators (e.g., one or more lights) and/or audible signals (e.g., a bell, a horn, etc.). In some examples, the user interface 604 interacts with a user indirectly through a separate computing device (e.g., a smartphone, desktop computer, laptop computer, tablet computer, etc.). In some such examples, the display 624 of the controller system 600 may be omitted because the system relies on a display of the separate computing device. In some examples, user input data (e.g., interlock configuration data, scheduling configuration data, user authentication data, etc.) received via the user interface 604 are stored in the example database 622.

The example sensor interface 606 includes and/or interfaces with one or more sensors associated with the operation of the corresponding door. The sensors may include, for example, a motion sensor, a passive infrared detector, an ultrasonic emitter/receiver, a photoelectric eye, a radio signal transmitter, a camera, etc. In some examples, a user may trigger a request for the door to perform a particular operation via one or more of the sensors. Thus, in some examples, user input data may be received via the sensor interface 606 rather than the user interface 604. In some examples, the user interface 604 and the sensor interface 606 may be implemented in combination such that the user interface 604 may provide feedback to a user (e.g., via the display 624) in response to sensor data obtained by the sensor interface 606.

The example door configuration engine 608 functions in connection with the user interface 604 to facilitate a user in configuring the operations of the door associated with the controller system 600. In some examples, the door configuration engine 608 facilitates a user in configuring multiple doors. In examples, where the door configuration engine 608 obtains configuration data from a user for multiple doors, the door configuration engine 608 may invoke the communications interface 602 to wirelessly communicate relevant data to other doors for which the configuration data was obtained. In some examples, the door configuration engine 608 analyzes the content of wireless signals received by the communications interface 602 to identify the doors in wireless network communication with the controller system 600. In some examples, the door configuration engine 608 may generate a list of discovered doors to the user for selection during a configuration process. In some example configuration processes, the door configuration engine 608 obtains interlock configuration data input by a user defining one or more particular operations for a door that are conditioned on the state of one or more other door. In some such examples, the interlock configuration data is stored in the database 622. Additionally or alternatively, the door configuration engine 608 may obtain scheduling configuration data input by a user that specifies an activation schedule for one or more components associated with a particular door. In some such examples, the scheduling configuration data is stored in the database 622.

The example interlock analyzer 610 analyzes the status of different doors within a wireless network based on the data included in the wireless signals received by the communications interface 602 from the different doors. In some examples, the interlock analyzer 610 compares the current states of the doors relative to interlock conditions to determine whether the conditions have been satisfied. In some examples, when a particular interlock condition is not satisfied due to the current state of a particular door, the interlock analyzer 610 may determine when the condition is expected to be satisfied and/or determine when the current state of the relevant door should be checked again to confirm whether the condition has become satisfied.

The example activation schedule analyzer 612 compares the current time from the example clock 620 to one or more activation schedules to determine whether one or more components are to be in an active state or a deactivated state.

The example user authenticator 614 verifies or authenticates a user detected in proximity to a corresponding door to determine whether to automatically implement a particular door operation such as, for example, opening the door for the user. In some examples, the user is detected by a mobile device sensor (via the sensor interface 606) detecting an authentication application running on a mobile device (e.g., a smartphone, tablet computer, etc.) carried by the user. In some examples, the authentication application invokes the wireless communication technology (e.g., Bluetooth, Wi-Fi, etc.) of the mobile device to enable the detection by the sensor. In some examples, the user authenticator 614 requests and/or otherwise receives authentication data from the mobile device in communication with the mobile device sensor. The user authenticator 614 may identify and/or authenticate the user by looking up the user in a table or other data structure stored in the database 622 containing a list of users to which the authentication application has been issued. Further, in some examples, the user authenticator 614 looks up the credentials of the user to determine whether the particular door operation for which the authentication application was issued is authorized for the user.

The example door operation controller 616 controls operation of a corresponding door based on information obtained from and/or generated by any one of the example communications interface 602, the example user interface 604, the example sensor interface 606, the example door configuration engine 608, the example interlock analyzer 610, the example activation schedule analyzer 612, and/or the example user authenticator 614. For example, the door operation controller 616 may cause a corresponding door to open or close (or perform any other operation) based on a request for such from a user provided via the user interface. Similarly, the door operation controller 616 may cause a corresponding door to open or close (or perform any other operation) based on a request for such arising from feedback from one or more sensors via the sensor interface. Further, the door operation controller 616 may inhibit, delay, or prevent a requested door operation if the interlock analyzer 610 determines that a corresponding interlock condition is not satisfied. Further still, in some examples, the door operation controller 616 activates or deactivates components associated with the door based on an activation schedule for the components as determined by the activation schedule analyzer 612. In some examples, the door operation controller 616 automatically implements a particular door operation in response to the user authenticator 614 authenticating the presence of a particular user with the appropriate credentials authorizing the particular door operation.

The example notification generator 618 generates notifications, alerts, and/or other messages for a user at a door based on the operation of the door and/or based on the wireless signals received from other doors. For instance, in some examples, when the interlock analyzer 610 determines that an interlock condition for a requested door operation is not satisfied, the notification generator 618 generates a notification to inform the user the requested operation cannot currently be executed. In some examples, the notification may include an indication of the particular door (e.g., a serial number or other identifier for the door) that is the basis for the interlock condition not being satisfied. In some examples, the notification includes the current state of the other door. In some examples, the notification includes a timer associated with the current state of the other door to provide an estimate when the interlock condition is expected to be satisfied so that the requested operation can be performed. The notification need not be related to an interlock condition. The notification may include maintenance information associated with the other door. In some examples, the notification generator 618 may generate a notification at a corresponding door providing any of the above information corresponding to any other wirelessly networked door regardless of whether the two doors have an interlocking relationship. In some examples, the notification may include a message indicating the particular user is not authorized to perform the requested operation as determined by the user authenticator 614. In some examples, the notification may be generated in response to a user request for the notification.

In some examples, the different ones of the blocks shown in FIG. 6 are implemented by separate devices. That is, while the controller system 600 may be implemented as a single unit, in some examples, the controller system 600 includes multiple interconnected components. For instance, in some examples, the user interface 604 may be divided into a user input interface that receives inputs from a user and a separate user output interface that provides notifications and/or other feedback to a user, both of which may be implemented by separate devices to the door operation controller 616.

While an example manner of implementing the controller system 600 (and/or any one of the controller systems 108, 110, 112, 124, 510 of FIGS. 1 and/or 5) is illustrated in FIG. 6, one or more of the elements, processes and/or devices illustrated in FIG. 6 may be combined, divided, re-arranged, omitted, eliminated and/or implemented in any other way. Further, the example communications interface 602, the example user interface 604, the example sensor interface 606, the example door configuration engine 608, the example interlock analyzer 610, the example activation schedule analyzer 612, the example user authenticator 614, the example door operation controller 616, the example notification generator 618, the example clock 620, the example database 622, the example display 624 and/or, more generally, the example controller system 600 of FIG. 6 may be implemented by hardware, software, firmware and/or any combination of hardware, software and/or firmware. Thus, for example, any of the example communications interface 602, the example user interface 604, the example sensor interface 606, the example door configuration engine 608, the example interlock analyzer 610, the example activation schedule analyzer 612, the example user authenticator 614, the example door operation controller 616, the example notification generator 618, the example clock 620, the example database 622, the example display 624 and/or, more generally, the example controller system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 602, the example user interface 604, the example sensor interface 606, the example door configuration engine 608, the example interlock analyzer 610, the example activation schedule analyzer 612, the example user authenticator 614, the example door operation controller 616, the example notification generator 618, the example clock 620, the example database 622, and/or the example display 624 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller systems 108, 110, 112, 124, 510, 600 of FIGS. 1, 5, and/or 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
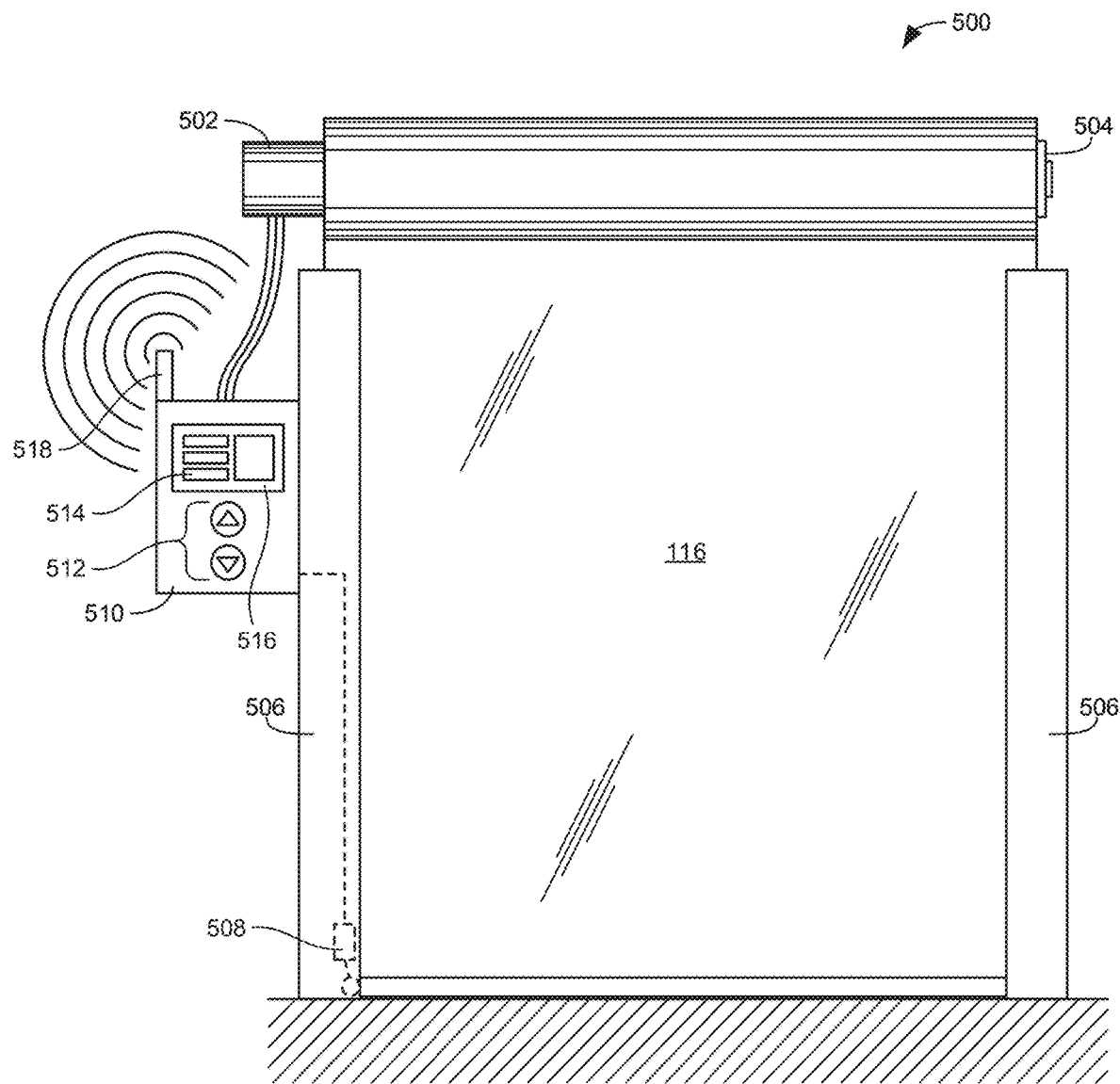
FIG. 5 illustrates an example door constructed in accordance with teachings disclosed herein that may correspond to any one of the doors in FIGS. 1-4.

Flowchart representative of example hardware logic, machine readable instructions, hardware implemented state machines, and/or any combination thereof for implementing the controller systems 108, 110, 112, 124, 510, 600 of FIGS. 1, 5, and/or 6 is shown in FIGS. 7-11. The machine readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 7-11, many other methods of implementing the example controller systems 108, 110, 112, 124, 510, 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 7:
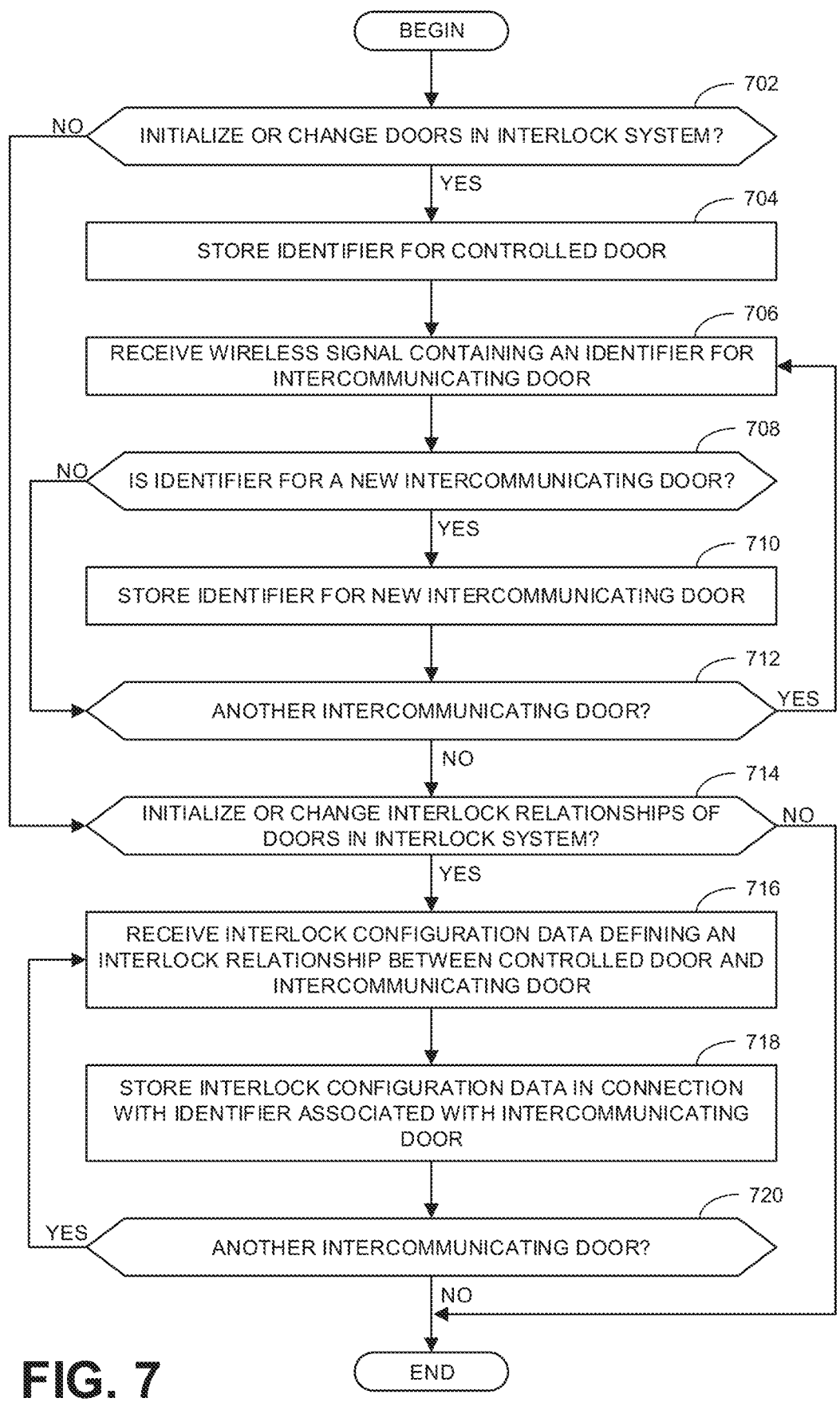
FIGS. 7-11 are flowcharts representative of example machine readable instructions that may be executed to implement any one of the controller systems of FIGS. 1, 5, and/or 6.
Figure 8:
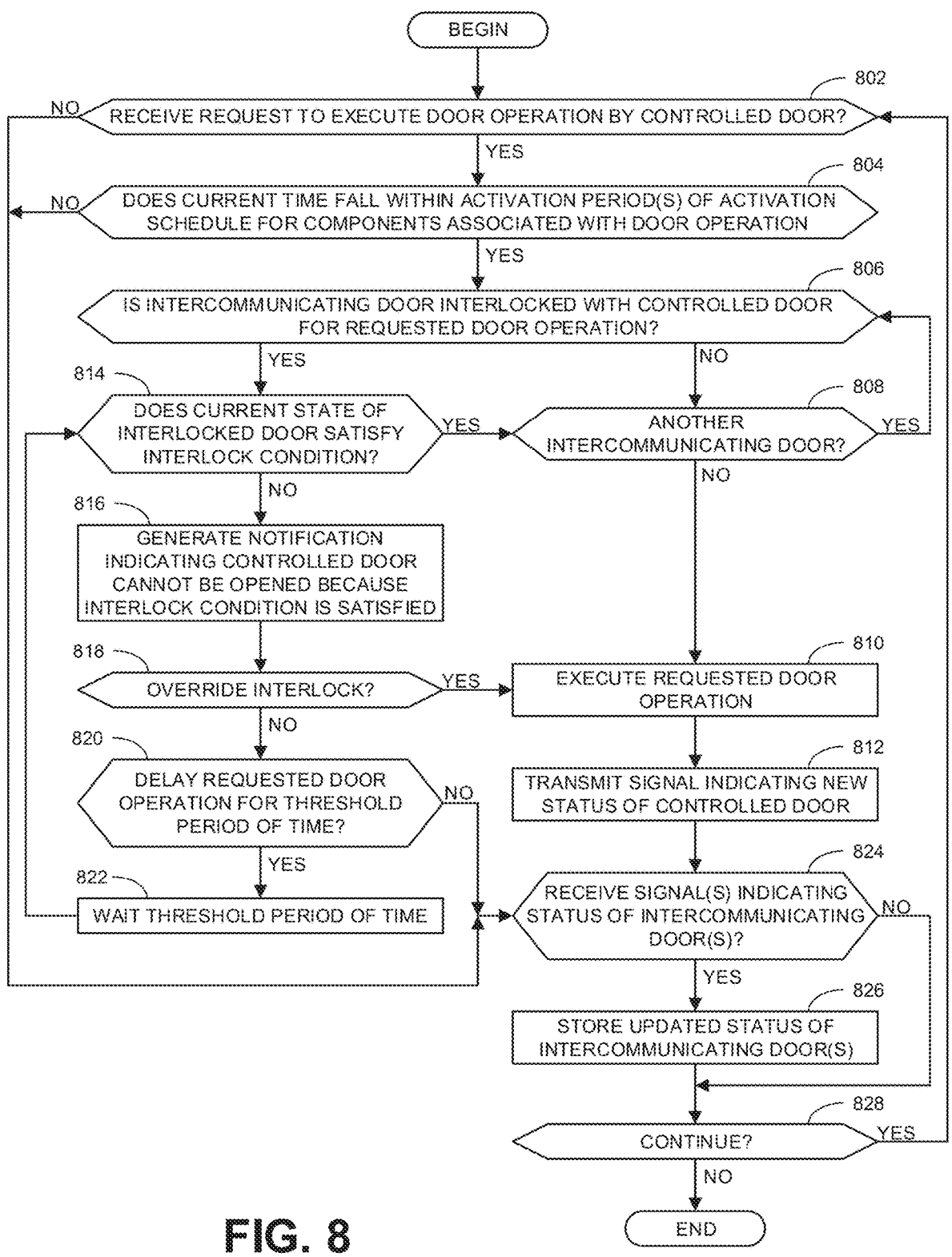

Turning in detail to the flowcharts, FIG. 7 is representative of machine readable instructions that may be executed to implement any one of the controller systems 108, 110, 112, 124, 510, 600 to initialize and/or change the doors included in a door interlock system associated with the controller systems and/or to initialize and/or change the interlock relationships of the doors in the interlock system. FIG. 8 is representative of machine readable instructions that may be executed to implement any one of the controller systems 108, 110, 112, 124, 510, 600 during normal operations of the controller system after the associated interlock system has been initialized. For purposes of explanation, the example programs of FIGS. 7 and 8 are described with respect to the controller system 600 of FIG. 6 but, as mentioned above, may apply similarly to any one of the controller systems 108, 112, 112, 124, 510 of FIGS. 1 and 5. Further, for purposes of explanation, as referred to in the following description of the programs of FIGS. 7 and 8, the controller system 600 is assumed to be associated with a single door (e.g., one of the doors 102, 104, 106). Although FIGS. 7 and 8 are described below with respect to a single controller system 600 controlling a single door, in some examples, other controller systems associated with other doors in the interlock system may separately implement the same programs. For the sake of clarity, the particular door corresponding to the controller system 600 being implemented in FIGS. 7 and 8 is referred to as the controlled door because it is the door that the controller system 600 directly controls. All other doors in the interlock system (controlled by other corresponding controller systems) are referred to as intercommunicating doors because they are not directly controlled by the first controller system 600 but nevertheless communicate with one another via the wireless signals 118, 120, 122.

The program of FIG. 7 begins at block 702 where the example door configuration engine 608 determines whether to initialize or change doors in an interlock system. In some examples, the door configuration engine 608 determines this based on a user request, received via the user interface 604, to initialize a new interlock system or change the doors in an existing interlock system (e.g., by adding new intercommunicating doors or removing existing intercommunicating doors). If the doors in the interlock system are not to be initialized or changed, control advances directly to block 714. Otherwise, control advances to block 704 where the example database 622 stores an identifier for the controlled door (i.e., the door being controlled by the controller system 600 being implemented with the example process of FIG. 7). In some examples, the identifier for the controlled door may be stored once when the door is first installed and/or initialized such that block 704 may be skipped when the interlock system is simply being changed.

At block 706, the example communications interface 602 receive a wireless signal containing an identifier for an intercommunicating door. At block 708, the example door configuration engine 608 determines whether the identifier is for a new intercommunicating door. If so, control advances to block 710 where the example database 622 stores the identifier for the new intercommunicating door. At block 712, the example door configuration engine 608 determines whether there is another intercommunicating door. If so, control returns to block 706 to collect the identifier associated with the additional intercommunicating door. If the example door configuration engine 608 determines that the identifier is not for a new intercommunicating door (block 708), control advances directly to block 712. If the example door configuration engine 608 determines there are no intercommunicating doors (block 712), control advances to block 714. Although the example process of FIG. 7 is shown as identifying one door at a time in a sequential matter, in other examples, multiple doors may be identified non-sequentially. That is, identifiers for multiple doors may be received at substantially the same time to then store them all together.

At block 714, the example door configuration engine 608 determines whether to initialize or change interlock relationships of doors in the interlock system. As with block 702, the example door configuration engine 608 may determine to initialize or change interlock relationships based on a user input requesting such. Whereas blocks 702-712 are concerned with adding or removing doors (identified by corresponding identifiers) to the interlock system, block 714 (and blocks 716-720 that follow) is concerned with obtaining interlock configuration data from a user defining the particular door operation(s) of the controlled door that are to be interlocked with one or more intercommunicating doors and defining the state(s) of the intercommunicating door(s) that are to serve as the interlock condition to be satisfied for the door operation to be executed. If no interlock relationships are to be initialized or changed, the example process of FIG. 7 ends. However, if the example door configuration engine 608 determines to initialize or change the interlock relationships, control advances to block 716.

At block 716, the example user interface 604 receives interlock configuration data defining an interlock relationship between the controlled door and an intercommunicating door. In some examples, the particular operation of the controlled door and the corresponding state of the intercommunicating door that causes the controller system 600 to inhibit the particular door operation may be fixed at the time the configuration process begins. For example, the particular operation of the controlled door may be to open the door and the interlock condition that must be satisfied for the controlled door to open is that the intercommunicating door is in a closed state. With the door operation and interlock condition fixed in this manner, the interlock configuration data received at block 716 may involve a binary choice of the user to either disregard the state of the intercommunicating door or designate the intercommunicating door as being in an interlocking relationship with the controlled door. In other examples, a user may specifically select or define the particular door operation to be configured and specifically select or define the particular state of an intercommunicating door that satisfies an interlock condition to enable the particular door operation. At block 718, the database 622 stores the interlock configuration data in connection with the identifier associated with the intercommunicating door. At block 720, the example door configuration engine 608 determines whether there is another intercommunicating door. In some examples, this determination is made based on the number of intercommunicating door identifiers stored in the database 622 at block 710. If there is another intercommunicating door, control returns to block 716. Otherwise, the example process of FIG. 7 ends.

Although the example process of FIG. 7 is shown as configuring one door at a time in a sequential matter, in other examples, multiple doors may be configured non-sequentially. That is, the interlock relationships for some or all doors in the system may be received at a same time to then store the information together. Further, in some examples, when a particular controller system 600 receives interlock configuration data for multiple doors, the controller system 600 may communicate the relevant interlock configuration data to the corresponding intercommunicating doors. In this manner, the intercommunicating doors may be configured without a user have to separately repeat the process of FIG. 7 at each door.

The example program of FIG. 8 begins at block 802 where the example door operation controller 616 determines whether a request to execute a door operation by the controlled door has been received. In some examples, the request may arise based on a user input request via the user interface 604. In some examples, the request may arise based on sensor data obtained via the sensor interface 606. If no request has been received, control moves to the block 824 discussed further below. In an alternative process, control remains at block 802 to await a request to execute a door operation. If a request to execute the door operation has been received, control advances to block 804 where the example activation schedule analyzer 612 determines whether the current time falls within the activation period(s) of an activation schedule for components associated with the door operation. If not, control advances to block 824 without implementing the operation because the components are not activated to do so. If the current time does fall within the activation period, control advances to block 806 where the example interlock analyzer 610 determines whether an intercommunicating door is interlocked with the controlled door for the requested door operation. An intercommunicating door is interlocked with the controlled door when the requested door operation is conditioned on the particular state of the intercommunicating door. If the intercommunicating door is not interlocked with the controlled door, control advances to block 808.

At block 808, the example interlock analyzer 610 determines whether there is another intercommunicating door. If so, control returns to block 806 to repeat the process for each intercommunicating door in the interlock system. In this manner, the interlock relationship with every intercommunicating door is checked before the requested door operation is executed. If, at block 808, the example interlock analyzer 610 determines there are no more intercommunicating doors to consider, control advances to block 810 where the example door operation controller 616 executes the requested door operation. At block 812, the example communications interface 602 transmits a signal indicating the new status of the controlled door. The new status of the door is based on a change in the current state of the door caused by the implementation of the requested door operation. In this manner, the intercommunicating doors are informed of the new current state of the controlled door, which may impact the operation of the intercommunicating doors. After transmitting the signal indicating the new status of the controlled door (block 812), control advances to block 824.

Returning to block 806, if the example interlock analyzer 610 determines that the intercommunicating door is interlocked with the controlled door for the requested door operation, control advances to block 814. When an intercommunicating door is interlocked with the controlled door, the requested operation of the controlled door will be inhibited unless the interlock condition defining the interlock relationship is satisfied. Accordingly, at block 814, the example interlock analyzer 610 determines whether the current state of the interlocked door satisfies the interlock condition. In some examples, this determination is made by referencing the status (e.g., current state) of the interlocking door stored in the example database 622. In some examples, the determination of whether the interlock condition is satisfied is made by wirelessly transmitting an operation request signal to the interlocked door to request status information. In response to such a request signal, the interlocked door may wirelessly transmit a status response signal that includes an indication of the current state of the interlocked door. In some examples, the operation request signal is broadcast to all intercommunicating doors such that all intercommunicating doors may provide a corresponding status response signal. In some examples, the determination of whether the interlock condition is satisfied is made by requesting status data for the interlocked door from a master controller that is not associated with any particular door. If the example interlock analyzer 610 determines that the interlock condition is satisfied, the current state of the interlocked door does not limit the execution of the requested door operation such that control advances to block 808 to analyze any other intercommunicating doors as discussed above. If, at block 814, the interlock analyzer 610 determines that the interlock condition is not satisfied, control advances to block 816 where the example notification generator 618 generates a notification indicating the controlled door cannot be opened because the interlock condition is not currently satisfied. In some examples, the notification may be provided to the user via the display 624. In some examples, the notification may provide the identifier associated with the interlocked door to inform a user which interlocked door is preventing the requested door operations. Additionally or alternatively, the notification may indicate the status of the interlocked door (and/or other intercommunicating doors) including, for example, whether the doors are opened or closed, whether there is an outstanding request to open or close such doors, a time when the other doors are expected to open or close, etc. In some examples, block 816 may be omitted. Thereafter, control advances to block 818.

At block 818, the user interface 604 determines whether a user chooses to dismiss or otherwise override the interlock condition. In some examples, a user may not be given an option to override the interlock condition such that block 818 may be omitted. If the user opts to override the interlock condition, control advances to block 810 to execute the requested door operation as discussed above. If the user does not opt to override the interlock condition, control advances to block 820 where the example door operation controller 616 determines whether to delay the requested door operation for a threshold period of time. In some examples, the threshold period of time is based on an estimated duration that the interlocked door will remain in a state that fails to satisfy the interlock condition. If the example door operation controller 616 determines whether to delay the requested door operation, control advances to block 822 where the example door operation controller 616 waits the threshold period of time. Thereafter, control returns to block 814 to verify whether the interlock condition is now satisfied. If the example door operation controller 616 determines not to delay the requested door operation, control advances block 824.

At block 824, the communications interface 602 determines whether one or more signal(s) indicating the status of one or more intercommunicating door(s) have been received. If so, control advances to block 826 where the example database 622 stores the updated status of the intercommunicating door(s). Thereafter, at block 828, the example process of FIG. 8 determines whether to continue. If so, control returns to block 802. In some examples, the example process of FIG. 8 will continue until the requested door operation is implemented. Otherwise the example process of FIG. 8 ends. Returning to block 824, if no signal(s) indicating the status of the intercommunicating door(s) have been received, control advances directly to block 828 to determine whether to continue or end the process.

Figure 9:
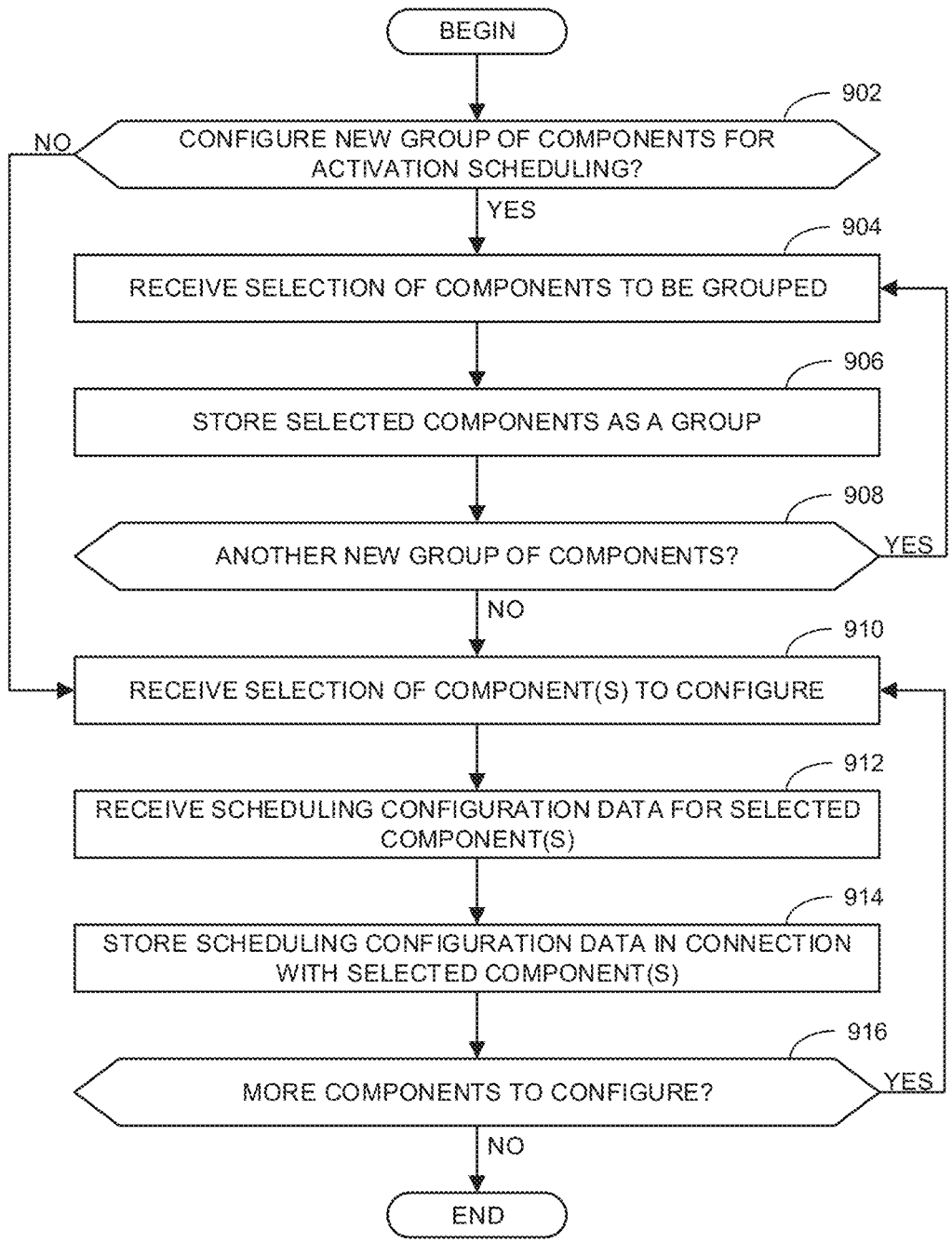
Figure 10:
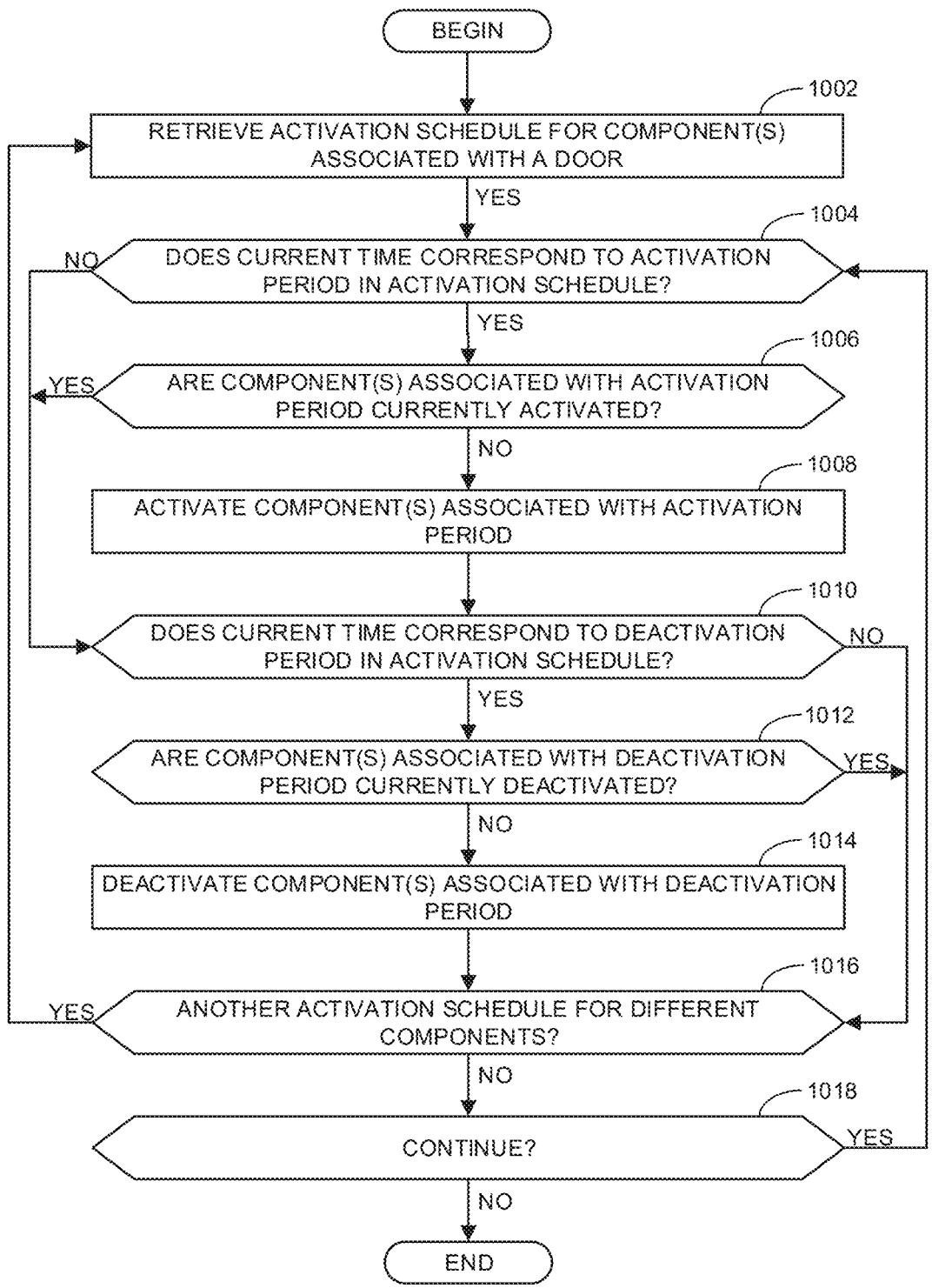

FIG. 9 is representative of machine readable instructions that may be executed to implement any one of the controller systems 108, 110, 112, 124, 510, 600 to configure components associated with a corresponding door to be activated or deactivated according to an activation schedule. FIG. 10 is representative of machine readable instructions that may be executed to implement any one of the controller systems 108, 110, 112, 124, 510, 600 during normal operations of the controller system after the associated door has been configured with one or more activation schedules.

The example program of FIG. 9 begins at block 902 where the example door configuration engine 608 determines whether to configure a new group of components for activation scheduling. If so, control advances to block 904 where the example user interface 604 receives a selection of components to be grouped. In some examples, the components may be selected or grouped based on a particular type or class of component (e.g., all motion sensors). In some examples, the components may be selected or grouped based on their location (e.g., on an exterior side of the door versus the interior side of the door). At block 906, the example database 622 stores the selected components as a group. At block 908, the the example door configuration engine 608 determines whether there is another group of components to configure as a group. If so, control returns to block 904. Otherwise, control advances to block 910. Returning to block 902, if the example door configuration engine 608 determines that no new groups of components for activation scheduling are to be configured, control advances directly to block 910.

At block 910, the example user interface 604 receives a selection of component(s) to configure. In some examples, the selection may be based on a group of components previously defined at blocks 902-908. At block 912, the example user interface 604 receives scheduling configuration data for the selected component(s). In some examples, the scheduling configuration data defines the time(s) of the day and/or the day(s) of the week when the corresponding component(s) are to be activated. At block 914, the example database 622 stores the scheduling configuration data in connection with the selected component(s). Thereafter, at block 916, the example door configuration engine 608 determines whether there are more components to configure (e.g., with a different activation schedule). If so, control returns to block 910. Otherwise, the example process of FIG. 9 ends.

The example program of FIG. 10 begins at block 1002 where the example activation schedule analyzer 612 retrieves an activation schedule for component(s) associated with a door. At block 1004, the example activation schedule analyzer 612 determines whether the current time corresponds to an activation period in the activation schedule. If so, control advances to block 1006 where the example activation schedule analyzer 612 determines whether the component(s) associated with the activation period are currently activated. If not, control advances to block 1008 where the example door operation controller 616 activates the component(s) associated with the activation period. Thereafter, control advances to block 1010. Returning to block 1004, if the example activation schedule analyzer 612 determines that the current time does not correspond to the activation period in the activation schedule, control advances directly to block 1010. Similarly, at block 1006, if the example activation schedule analyzer 612 determines that the component(s) associated with the activation period are already activated, control advances directly to block 1010.

At block 1010, the example activation schedule analyzer 612 determines whether the current time corresponds to a deactivation period in the activation schedule. If so, control advances to block 1012 where the example activation schedule analyzer 612 determines whether the component(s) associated with the deactivation period are currently deactivated. If not, control advances to block 1014 where the example door operation controller 616 deactivates the component(s) associated with the activation period. Thereafter, control advances to block 1016. Returning to block 1010, if the example activation schedule analyzer 612 determines that the current time does not correspond to the deactivation period in the activation schedule, control advances directly to block 1016. Similarly, at block 1012, if the example activation schedule analyzer 612 determines that the component(s) associated with the deactivation period are already deactivated, control advances directly to block 1016.

At block 1016, the example activation schedule analyzer 612 determines whether there is another activation schedule for different component(s). If so, control returns to block 1002. Otherwise, the example process advances to block 1018 where the example activation schedule analyzer 612 determines whether to continue the process. If so, control returns to block 1004 to reevaluate the activation schedule(s) based on the new current. If the example activation schedule analyzer 612 determines not to continue, the example process of FIG. 10 ends.

Figure 11:
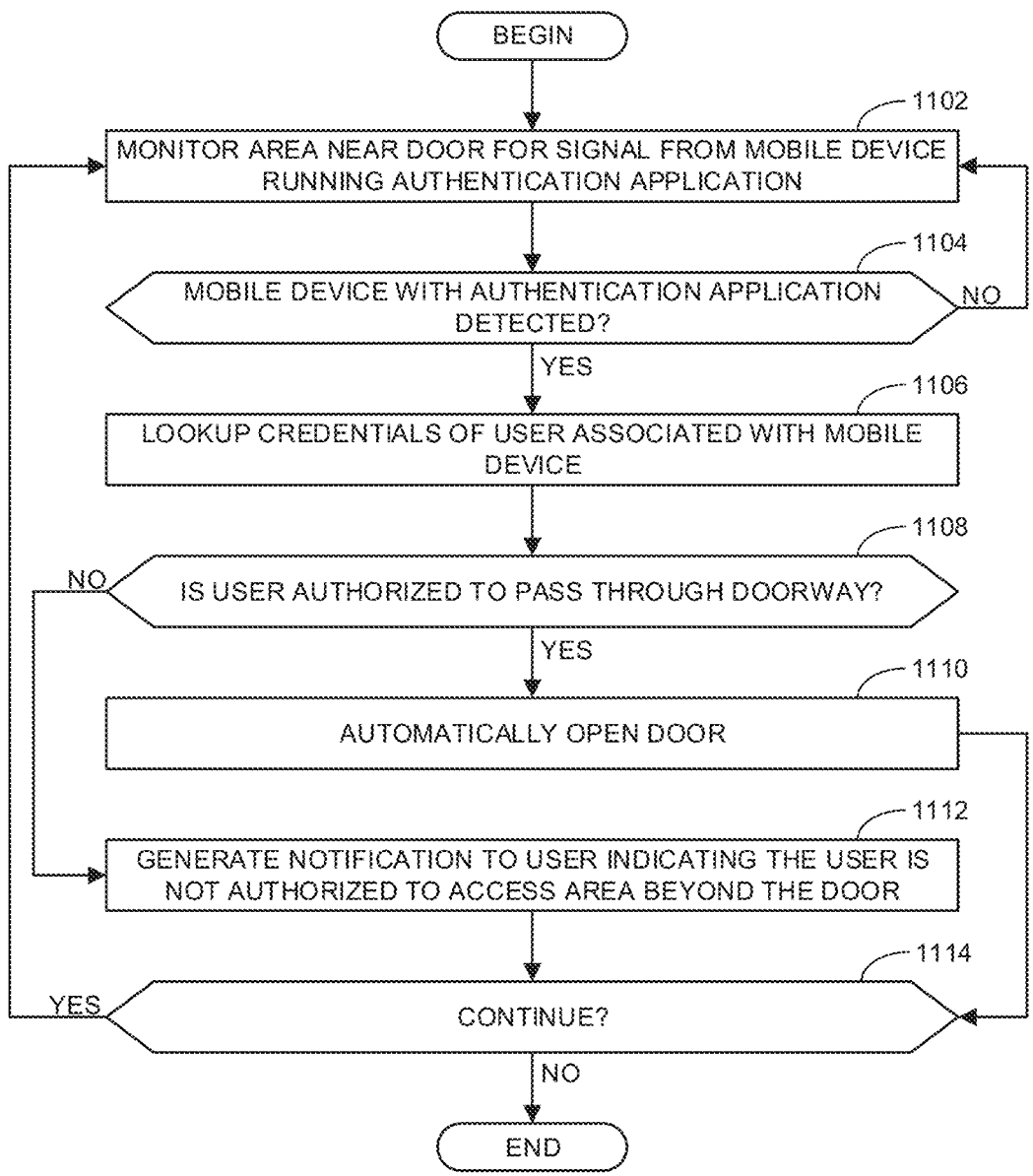

FIG. 11 is representative of machine readable instructions that may be executed to implement any one of the controller systems 108, 110, 112, 124, 510, 600 to implement passive, discriminative activation of a corresponding door. As described above, passive, discriminative activation of a door involves the automatic opening of a door as a person approaches the door without the person having to perform any affirmative act (hence passive) but that is only opened for particular individuals that can be uniquely identified or authenticated (hence discriminative).

The example program of FIG. 11 begins at block 1102 where the example sensor interface 606 monitors an area near a door for a signal from a mobile device running an authentication application. In some examples, a particular sensor capable of wirelessly communicating with mobile devices broadcasts a request signal that triggers a response by the authentication application. In some examples, the authentication application may broadcast a signal to be detected by the sensor independent of any request. At block 1104, the example sensor interface 604 determines whether a mobile device with the authentication application is detected. If not, control returns to block 1102 to continue monitoring for such a mobile device. If the sensor interface 606 detects such a mobile device, control advances to block 1106 where the example user authenticator 614 looks up the credentials of the user associated with the mobile device. At block 1108, the example user authenticator 614 determines whether the user is authorized to pass through the doorway. If so, control advances to block 1110 where the example door operation controller 616 automatically opens the door. Thereafter, control advances to block 1114.

Returning to block 1108, if the example user authenticator 614 determines that the user is not authorized to pass through the doorway, control advances to block 1112 where the example notification generator 618 generates a notification to the user indicating the user is not authorized to access the area beyond the door. In some examples, the notification is provided to the user via the display 624. Additionally or alternatively, the notification may be provided to the user via a wireless communication to the mobile device of the user. Thereafter, control advances to block 1114 where the example user authenticator 614 determines whether to continue. If so, control returns to block 1102. Otherwise, the example process of FIG. 11 ends.

Figure 12:
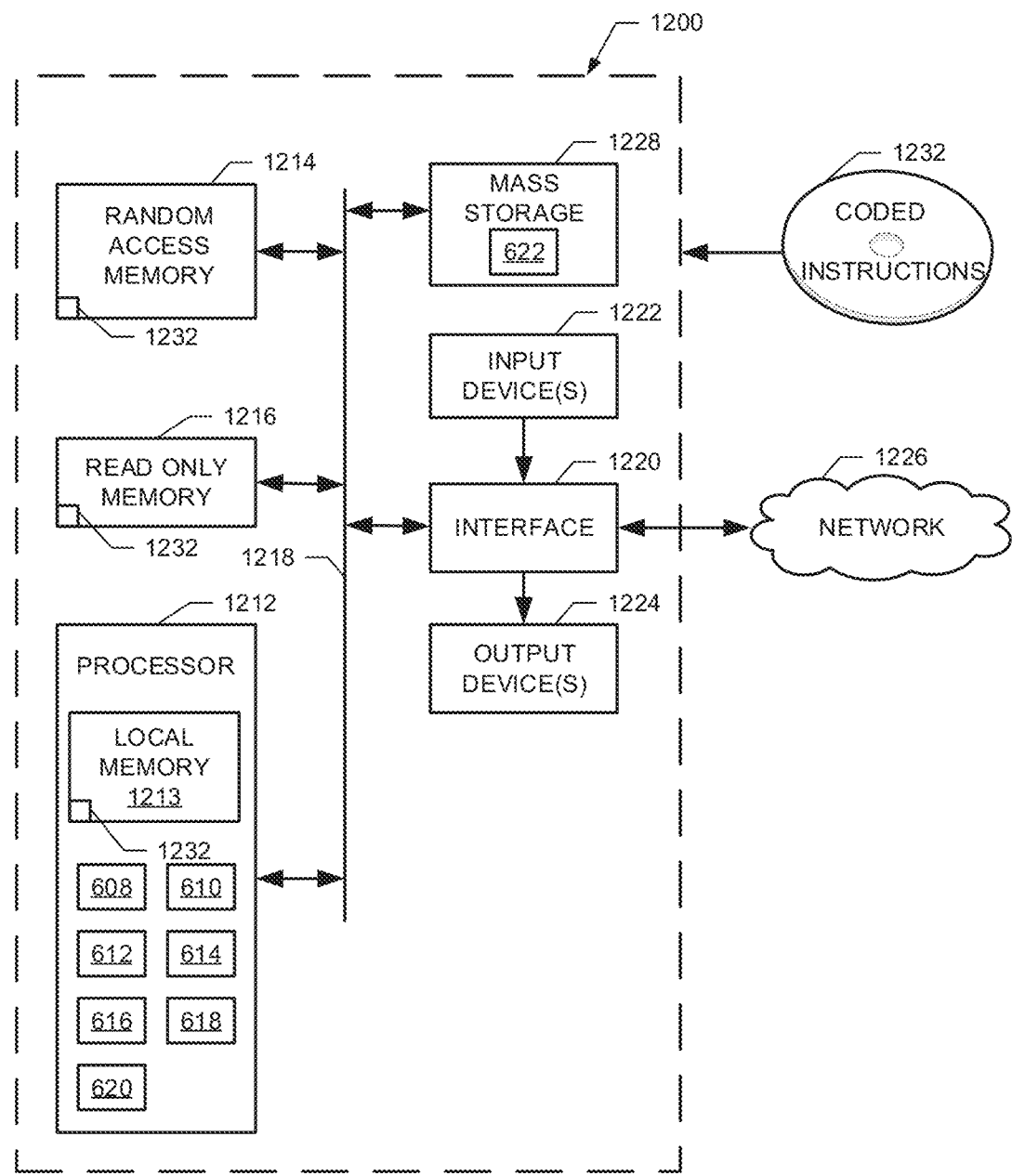
FIG. 12 is a block diagram of an example processing platform structured to execute the instructions of FIGS. 7, 8, 9, 10, and/or 11 to implement any one of the controller systems of FIGS. 1, 5, and/or 6.

FIG. 12 is a block diagram of an example processor platform 1200 structured to execute the instructions of FIGS. 7-11 to implement the controller systems 108, 110, 112, 124, 510, 600 of FIGS. 1, 5, and/or 6. The processor platform 1200 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example door configuration engine 608, the example interlock analyzer 610, the example activation schedule analyzer 612, the example user authenticator 614, the example door operation controller 616, the example notification generator 618, and the example clock 620.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. In this example, the mass storage device 1228 includes the example database 622.

The machine executable instructions 1232 of FIGS. 7-11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that enable the wireless communication of the current state of doors to facilitate the implementation of door interlock systems that can be easily reconfigured without the cost and/or complexity associated with hardwired systems. The flexibility of implemented wireless communication systems as disclosed herein also provides other advantages including the ability to verify interlock conditions before implementing particular door operations and/or enabling users to override interlock conditions as needed. Further, the wireless signals transmitted between doors can provide relevant information regarding one door for display on a screen associated with any other door. In this manner, users may be informed of the status of any door in a networked system of doors and/or the reasons why a particular operation is current prohibits and when the operation is expected to be available. Further, examples disclosed herein enable the control of when particular components and/or associated door operations are available by configuring activation schedules for the components. Further still, examples disclosed herein provide a method to activate doors that is both passive (does not require an affirmative action by a person) and discriminative (limited to individuals that can be identified or authenticated).

Example 1 includes a door system comprising a user interface to receive interlock configuration data input from a user, the interlock configuration data to define an interlock condition to be satisfied before a first door is to undergo an operation, the interlock condition associated with a current state of a second door, a first wireless transceiver associated with the first door, the first wireless transceiver to receive a signal from a second wireless transceiver associated with the second door, the signal to at least one of identify the second door or indicate the current state of the second door, and a door operation controller to at least one of (1) implement the operation of the first door in response to a request when the current state of the second door satisfies the interlock condition, (2) ignore the request, or (3) not execute the operation of the first door in response to the request when the current state of the second door does not satisfy the interlock condition.

Example 2 includes the door system as defined in example 1, wherein the interlock condition is satisfied when the second door is in a closed position.

Example 3 includes the door system as defined in example 2, wherein the operation of the first door is opening the first door.

Example 4 includes the door system as defined in example 2, wherein the interlock condition is satisfied when the second door is at least one of closing, about to close, or locked.

Example 5 includes the door system as defined in example 1, wherein the interlock condition is satisfied when the second door is at least one of open, partially open, opening, about to open, or unlocked.

Example 6 includes the door system as defined in example 1, wherein the interlock condition is satisfied when the second door is in at least one of an override state or a fault state.

Example 7 includes the door system as defined in example 1, wherein the operation of the first door is at least one of closing the first door, locking the first door, or unlocking the first door.

Example 8 includes the door system as defined in example 1, wherein the operation of the first door is generating a notification in an area adjacent at least one side of the first door.

Example 9 includes the door system as defined in example 1, wherein the interlock condition is a first interlock condition and the operation of the first door is a first operation, the interlock configuration data to define a second interlock condition to be satisfied before the second door is to undergo a second operation, the second interlock condition associated with a current state of the first door, the first wireless transceiver to transmit the second interlock condition to the second wireless transceiver.

Example 10 includes the door system as defined in example 1, wherein the signal is a first signal, and the first wireless transceiver is to transmit a second signal in response to a change in a current state of the first door, the second signal to at least one of identify the first door or indicate the current state of the first door.

Example 11 includes the door system as defined in example 1, wherein the signal is a status response signal, and the first wireless transceiver is to transmit an operation request signal to the second wireless transceiver in response to the request, the operation request signal to request the current state of the second door, the second wireless transceiver to transmit the status response signal in response to the operation request signal.

Example 12 includes the door system as defined in example 11, wherein the door operation controller is to delay implementation of the operation until after receipt of the status response signal.

Example 13 includes the door system as defined in example 1, further including a display screen to be adjacent the first door, and a notification generator to generate a notification for display via the display screen, the notification to be based on information included in the signal from the second wireless transceiver associated with the second door.

Example 14 includes the door system as defined in example 13, wherein the notification includes an indication of at least one of the current state of the second door, a timer associated with the current state of the second door, an identifier of the second door, or maintenance information associated with the second door.

Example 15 includes the door system as defined in example 13, wherein the notification generator is to generate the notification when the current state of the second door does not satisfy the interlock condition, the notification to indicate the operation is not available because of the interlock condition.

Example 16 includes the door system as defined in example 1, further including a door identifier to discover doors within wireless communication range of the first door based on signals received by the first wireless transceiver, the discovered doors including the second door, and a display screen associated with the user interface, the display screen to display the discovered doors to the user when providing the interlock configuration data.

Example 17 includes the door system as defined in example 1, wherein the user interface is associated with a master controller located remotely from the first door.

Example 18 includes the door system as defined in example 1, wherein the user interface is to receive scheduling configuration data from the user, the scheduling configuration data to define an activation schedule for a component of the first door, the activation schedule defining when the component is to be active.

Example 19 includes the door system as defined in example 18, wherein the component corresponds to at least one of a card reader, a light, or a motion sensor.

Example 20 includes the door system as defined in example 18, wherein the scheduling configuration data defines a plurality of activation schedules, different ones of the activation schedules corresponding to different components associated with the first door.

Example 21 includes the door system as defined in example 1, further including a mobile device proximity sensor to detect a mobile device in proximity to the first door based on an authentication application running on the mobile device, and a user authenticator to authenticate a user of the mobile device based on a wireless communication with the mobile device, the door operation controller to automatically open the first door in response to authentication of the user of the mobile device.

Example 22 includes a non-transitory computer readable medium comprising instructions that, when executed, cause a machine to at least store interlock configuration data input from a user, the interlock configuration data to define an interlock condition to be satisfied before a first door is to undergo an operation, the interlock condition associated with a current state of a second door, and determine the current state of the second door based on a signal wirelessly transmitted from the second door, and in response to a request to implement the operation, (1) implement the operation of the first door when the current state of the second door satisfies the interlock condition, (2) ignore the request, or (3) inhibit execution of the operation of the first door when the current state of the second door does not satisfy the interlock condition.

Example 23 includes the non-transitory computer readable medium as defined in example 22, wherein the interlock condition is satisfied when the second door is in a closed position.

Example 24 includes the non-transitory computer readable medium as defined in example 23, wherein the operation of the first door is opening the first door.

Example 25 includes the non-transitory computer readable medium as defined in example 23, wherein the interlock condition is satisfied when the second door is at least one of closing, about to close, or locked.

Example 26 includes the non-transitory computer readable medium as defined in example 22, wherein the interlock condition is satisfied when the second door is at least one of open, partially open, opening, about to open, or unlocked.

Example 27 includes the non-transitory computer readable medium as defined in example 22, wherein the interlock condition is satisfied when the second door is in at least one of an override state or a fault state.

Example 28 includes the non-transitory computer readable medium as defined in example 22, wherein the operation of the first door is at least one of closing the first door, locking the first door, or unlocking the first door.

Example 29 includes the non-transitory computer readable medium as defined in example 22, wherein the operation of the first door is generating a notification in an area adjacent at least one side of the first door.

Example 30 includes the non-transitory computer readable medium as defined in example 22, wherein the interlock condition is a first interlock condition and the operation of the first door is a first operation, the interlock configuration data to define a second interlock condition to be satisfied before the second door is to undergo a second operation, the second interlock condition associated with a current state of the first door, the instructions further causing the machine to transmit the second interlock condition to the second door.

Example 31 includes the non-transitory computer readable medium as defined in example 22, wherein the signal is a first signal, the instructions to cause the machine to wirelessly transmit a second signal in response to a change in a current state of the first door, the second signal to at least one of identify the first door or indicate a current state of the first door.

Example 32 includes the non-transitory computer readable medium as defined in example 22, wherein the signal is a status response signal, the instructions to cause the machine to transmit an operation request signal to the second door in response to the request, the operation request signal to request the current state of the second door, the second door to transmit the status response signal in response to the operation request signal.

Example 33 includes the non-transitory computer readable medium as defined in example 32, wherein the instructions further cause the machine to delay implementation of the operation until after receipt of the status response signal.

Example 34 includes the non-transitory computer readable medium as defined in example 22, wherein the instructions further cause the machine to generate a notification for display via a display screen adjacent the first door, the notification based on information included in the signal from the second door.

Example 35 includes the non-transitory computer readable medium as defined in example 34, wherein the notification includes an indication of at least one of the current state of the second door, a timer associated with the current state of the second door, an identifier of the second door, or maintenance information associated with the second door.

Example 36 includes the non-transitory computer readable medium as defined in example 34, wherein the instructions further cause the machine to generate the notification when the current state of the second door does not satisfy the interlock condition, the notification to indicate the operation is not available because of the interlock condition.

Example 37 includes the non-transitory computer readable medium as defined in example 22, wherein the instructions further cause the machine to discover doors within wireless communication range of the first door based on signals received by a first wireless transceiver, the discovered doors including the second door, and display the discovered doors to the user for selection when configuring the interlock condition.

Example 38 includes the non-transitory computer readable medium as defined in example 22, wherein the instructions further cause the machine to store scheduling configuration data received from a user, the scheduling configuration data to define an activation schedule for a component of the first door, the activation schedule defining when the component is to be active.

Example 39 includes the non-transitory computer readable medium as defined in example 38, wherein the component corresponds to at least one of a card reader, a light, or a motion sensor.

Example 40 includes the non-transitory computer readable medium as defined in example 38, wherein the scheduling configuration data defines a plurality of activation schedules, different ones of the activation schedules corresponding to different components associated with the first door.

Example 41 includes the non-transitory computer readable medium as defined in example 22, wherein the instructions further cause the machine to detect a mobile device in proximity to the first door based on an authentication application running on the mobile device, authenticate a user of the mobile device based on a wireless communication with the mobile device, and automatically open the first door in response to authentication of the user of the mobile device.

Example 42 includes a method comprising storing, in a database, interlock configuration data input from a user, the interlock configuration data to define an interlock condition to be satisfied before a first door is to undergo an operation, the interlock condition associated with a current state of a second door, and determining, by executing an instruction with a processor, the current state of the second door based on a signal wirelessly transmitted from the second door, and in response to a request to implement the operation, (1) implementing the operation of the first door when the current state of the second door satisfies the interlock condition, (2) ignoring the request, or (3) inhibiting execution of the operation of the first door when the current state of the second door does not satisfy the interlock condition.

Example 43 includes the method as defined in example 42, wherein the interlock condition is satisfied when the second door is in a closed position.

Example 44 includes the method as defined in example 43, wherein the operation of the first door is opening the first door.

Example 45 includes the method as defined in example 43, wherein the interlock condition is satisfied when the second door is at least one of closing, about to close, or locked.

Example 46 includes the method as defined in example 42, wherein the interlock condition is satisfied when the second door is at least one of open, partially open, opening, about to open, or unlocked.

Example 47 includes the method as defined in example 42, wherein the interlock condition is satisfied when the second door is in at least one of an override state or a fault state.

Example 48 includes the method as defined in example 42, wherein the operation of the first door is at least one of closing the first door, locking the first door, or unlocking the first door.

Example 49 includes the method as defined in example 42, wherein the operation of the first door is generating a notification in an area adjacent at least one side of the first door.

Example 50 includes the method as defined in example 42, wherein the interlock condition is a first interlock condition and the operation of the first door is a first operation, the interlock configuration data to define a second interlock condition to be satisfied before the second door is to undergo a second operation, the second interlock condition associated with a current state of the first door, the method further including transmitting the second interlock condition to the second door.

Example 51 includes the method as defined in example 42, wherein the signal is a first signal, the method further including wirelessly transmitting a second signal in response to a change in a current state of the first door, the second signal to at least one of identify the first door or indicate a current state of the first door.

Example 52 includes the method as defined in example 42, wherein the signal is a status response signal, the method further including transmitting an operation request signal to the second door in response to the request, the operation request signal to request the current state of the second door, the second door to transmit the status response signal in response to the operation request signal.

Example 53 includes the method as defined in example 52, further including delaying implementation of the operation until after receipt of the status response signal.

Example 54 includes the method as defined in example 42, further including generating a notification for display via a display screen adjacent the first door, the notification based on information included in the signal from the second door.

Example 55 includes the method as defined in example 54, wherein the notification includes an indication of at least one of the current state of the second door, a timer associated with the current state of the second door, an identifier of the second door, or maintenance information associated with the second door.

Example 56 includes the method as defined in example 54, further including generating the notification when the current state of the second door does not satisfy the interlock condition, the notification to indicate the operation is not available because of the interlock condition.

Example 57 includes the method as defined in example 42, further including discovering doors within wireless communication range of the first door based on signals received by a first wireless transceiver, the discovered doors including the second door, and displaying the discovered doors to the user for selection when configuring the interlock condition.

Example 58 includes the method as defined in example 42, further including storing scheduling configuration data received from a user, the scheduling configuration data to define an activation schedule for a component of the first door, the activation schedule defining when the component is to be active.

Example 59 includes the method as defined in example 58, wherein the component corresponds to at least one of a card reader, a light, or a motion sensor.

Example 60 includes the method as defined in example 58, wherein the scheduling configuration data defines a plurality of activation schedules, different ones of the activation schedules corresponding to different components associated with the first door.

Example 61 includes the method as defined in example 42, further including detecting a mobile device in proximity to the first door based on an authentication application running on the mobile device, authenticating the user of the mobile device based on a wireless communication with the mobile device, and automatically opening the first door in response to authentication of the user of the mobile device.

Example 62 includes a door system comprising a door to move between an open position and a closed position, a user interface is to receive scheduling configuration data from a user, the scheduling configuration data to define an activation schedule for a component of the door, the activation schedule defining when the component is to be active, and a door operation controller to operate the door based on the activation schedule.

Example 63 includes the door system as defined in example 62, wherein the component corresponds to at least one of a card reader, a light, or a motion sensor.

Example 64 includes the door system as defined in example 62, wherein the scheduling configuration data defines a plurality of activation schedules, different ones of the activation schedules corresponding to different groups of components associated with the door.

Example 65 includes the door system as defined in example 64, wherein the different groups of components correspond to different types of the components.

Example 66 includes the door system as defined in example 64, wherein the different groups of components correspond to different locations associated with the door.

Example 67 includes a non-transitory computer readable medium comprising instructions that, when executed, cause a machine to at least move a door between an open position and a closed position, store scheduling configuration data received from a user, the scheduling configuration data to define an activation schedule for a component of the door, the activation schedule defining when the component is to be active, and operate the component of the door based on the activation schedule.

Example 68 includes the non-transitory computer readable medium as defined in example 67, wherein the component corresponds to at least one of a card reader, a light, or a motion sensor.

Example 69 includes the non-transitory computer readable medium as defined in example 67, wherein the scheduling configuration data defines a plurality of activation schedules, different ones of the activation schedules corresponding to different groups of components associated with the door.

Example 70 includes the non-transitory computer readable medium as defined in example 69, wherein the different groups of components correspond to different types of the components.

Example 71 includes the non-transitory computer readable medium as defined in example 69, wherein the different groups of components correspond to different locations associated with the door.

Example 72 includes a method comprising moving a door between an open position and a closed position, storing scheduling configuration data received from a user, the scheduling configuration data to define an activation schedule for a component of the door, the activation schedule defining when the component is to be active, and operating the component of the door based on the activation schedule.

Example 73 includes the method as defined in example 72, wherein the component corresponds to at least one of a card reader, a light, or a motion sensor.

Example 74 includes the method as defined in example 72, wherein the scheduling configuration data defines a plurality of activation schedules, different ones of the activation schedules corresponding to different groups of components associated with the door.

Example 75 includes the method as defined in example 74, wherein the different groups of components correspond to different types of the components.

Example 76 includes the method as defined in example 74, wherein the different groups of components correspond to different locations associated with the door.

Example 77 includes a door system comprising a door to move between an open position and a closed position, a mobile device proximity sensor to detect a mobile device in proximity to the door based on an authentication application running on the mobile device, a user authenticator to authenticate a user of the mobile device based on a wireless communication with the mobile device, the user authenticator to determine whether the user is authorized to use the door based on credentials of the user, and a door operation controller to (1) automatically open the door when the user is authorized to use the door or (2) inhibit opening the door when the user is not authorized to use the door.

Example 78 includes the door system as defined in example 77, further including a notification generator to generate a notification when the user is not authorized to use the door.

Example 79 includes a non-transitory computer readable medium comprising instructions that, when executed, cause a machine to at least move a door between an open position and a closed position, detect, via sensor, a mobile device in proximity to the door based on an authentication application running on the mobile device, authenticate a user of the mobile device based on a wireless communication with the mobile device, determine whether the user is authorized to use the door based on credentials of the user, in response to determining the user is authorized to use the door, automatically open the door, and in response to determining the user is not authorized to use the door, inhibit the door from opening.

Example 80 includes the non-transitory computer readable medium as defined in example 79, wherein the instructions further cause the machine to generate a notification when the user is not authorized to use the door.

Example 81 includes a method comprising moving a door between an open position and a closed position, detecting, via sensor, a mobile device in proximity to the door based on an authentication application running on the mobile device, authenticating, by executing an instruction with a processor, a user of the mobile device based on a wireless communication with the mobile device, determining, by executing an instruction with the processor, whether the user is authorized to use the door based on credentials of the user, in response to determining the user is authorized to use the door, automatically opening the door, and in response to determining the user is not authorized to use the door, inhibiting the door from opening.

Example 82 includes the method as defined in example 81, further including generating a notification when the user is not authorized to use the door.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    storing, in a database, interlock configuration data input from a user, the interlock configuration data to define an interlock condition to be satisfied before a first door is to undergo an operation, the interlock condition associated with a current state of a second door;
    determining, by executing an instruction with a processor, the current state of the second door based on a signal wirelessly transmitted from the second door; and
    in response to a request to implement the operation, (1) implementing the operation of the first door when the current state of the second door satisfies the interlock condition, (2) ignoring the request, or (3) inhibiting execution of the operation of the first door when the current state of the second door does not satisfy the interlock condition.

2. The method as defined in claim 1, wherein the interlock condition is satisfied when the second door is in a closed position.

3. The method as defined in claim 2, wherein the operation of the first door is opening the first door.

4. The method as defined in claim 2, wherein the interlock condition is satisfied when the second door is at least one of closing, about to close, or locked.

5. The method as defined in claim 1, wherein the interlock condition is satisfied when the second door is at least one of open, partially open, opening, about to open, or unlocked.

6. The method as defined in claim 1, wherein the interlock condition is satisfied when the second door is in at least one of an override state or a fault state.

7. The method as defined in claim 1, wherein the operation of the first door is at least one of closing the first door, locking the first door, or unlocking the first door.

8. The method as defined in claim 1, wherein the operation of the first door is generating a notification in an area adjacent at least one side of the first door.

9. The method as defined in claim 1, wherein the interlock condition is a first interlock condition and the operation of the first door is a first operation, the interlock configuration data to define a second interlock condition to be satisfied before the second door is to undergo a second operation, the second interlock condition associated with a current state of the first door, the method further including transmitting the second interlock condition to the second door.

10. The method as defined in claim 1, wherein the signal is a first signal, the method further including wirelessly transmitting a second signal in response to a change in a current state of the first door, the second signal to at least one of identify the first door or indicate the current state of the first door.

11. The method as defined in claim 1, wherein the signal is a status response signal, the method further including transmitting an operation request signal to the second door in response to the request, the operation request signal to request the current state of the second door, the second door to transmit the status response signal in response to the operation request signal.

12. The method as defined in claim 11, further including delaying implementation of the operation until after receipt of the status response signal.

13. The method as defined in claim 1, further including generating a notification for display via a display screen adjacent the first door, the notification based on information included in the signal from the second door.

14. The method as defined in claim 13, wherein the notification includes an indication of at least one of the current state of the second door, a timer associated with the current state of the second door, an identifier of the second door, or maintenance information associated with the second door.

15. The method as defined in claim 13, further including generating the notification when the current state of the second door does not satisfy the interlock condition, the notification to indicate the operation is not available because of the interlock condition.

16. The method as defined in claim 1, further including:
    discovering doors within wireless communication range of the first door based on signals received by a first wireless transceiver, the discovered doors including the second door; and
    displaying the discovered doors to the user for selection when configuring the interlock condition.

17. The method as defined in claim 1, further including storing scheduling configuration data received from the user, the scheduling configuration data to define an activation schedule for a component of the first door, the activation schedule defining when the component is to be active.

18. The method as defined in claim 17, wherein the component corresponds to at least one of a card reader, a light, or a motion sensor.

19. The method as defined in claim 17, wherein the scheduling configuration data defines a plurality of activation schedules, different ones of the activation schedules corresponding to different components associated with the first door.

20. The method as defined in claim 1, further including:
   detecting a mobile device in proximity to the first door based on an authentication application running on the mobile device;
   authenticating the user of the mobile device based on a wireless communication with the mobile device; and
   automatically opening the first door in response to authentication of the user of the mobile device.

* * * * *